US011227620B2

(12) United States Patent
Igarashi

(10) Patent No.: US 11,227,620 B2
(45) Date of Patent: Jan. 18, 2022

(54) INFORMATION PROCESSING APPARATUS AND INFORMATION PROCESSING METHOD

(71) Applicant: Saturn Licensing LLC, New York, NY (US)

(72) Inventor: Tatsuya Igarashi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 101 days.

(21) Appl. No.: 16/300,293

(22) PCT Filed: May 2, 2018

(86) PCT No.: PCT/JP2018/017484
§ 371 (c)(1),
(2) Date: Nov. 9, 2018

(87) PCT Pub. No.: WO2018/211983
PCT Pub. Date: Nov. 22, 2018

(65) Prior Publication Data
US 2020/0074994 A1    Mar. 5, 2020

(30) Foreign Application Priority Data

May 16, 2017   (JP) .............................. JP2017-097165

(51) Int. Cl.
*G10L 21/0272* (2013.01)
*G10L 15/20* (2006.01)
(Continued)

(52) U.S. Cl.
CPC .......... *G10L 21/0272* (2013.01); *G10L 15/20* (2013.01); *G10L 15/22* (2013.01);
(Continued)

(58) Field of Classification Search
CPC ...................................................... G10L 15/22
See application file for complete search history.

(56) References Cited

U.S. PATENT DOCUMENTS 10,360,905 B1 *  7/2019  Pereira ................. G06K 9/3266
2008/0120099 A1 *  5/2008  Relyea ..................... H04R 5/04
                                                                  704/227
2014/0019141 A1    1/2014  Park et al.
(Continued)

FOREIGN PATENT DOCUMENTS

EP    2 685 449 A1    1/2014
EP    2 965 496 A1    1/2016
(Continued)

OTHER PUBLICATIONS

International Search Report dated Aug. 8, 2018 in PCT/JP2018/017484, citing documents AA, AO, AP, and AQ therein, 5 page.

*Primary Examiner* — Douglas Godbold
(74) *Attorney, Agent, or Firm* — Oblon, McClelland, Maier & Neustadt, L.L.P.

(57) ABSTRACT

A system that acquires first audio data including a voice command captured by a microphone; identifies second audio data included in broadcast content corresponding to a timing at which the first audio data is captured by the microphone; extracts the second audio data from the first audio data to generate third audio data; converts the third audio data to text data corresponding to the voice command; and outputs the text data.

23 Claims, 16 Drawing Sheets

(51) Int. Cl.
*G10L 15/22* (2006.01)
*G10L 15/30* (2013.01)
*G10L 21/0232* (2013.01)
*G10L 25/84* (2013.01)
*G10L 15/26* (2006.01)

(52) U.S. Cl.
CPC ............. *G10L 15/26* (2013.01); *G10L 15/30* (2013.01); *G10L 21/0232* (2013.01); *G10L 25/84* (2013.01); *G10L 2015/223* (2013.01)

(56) References Cited

U.S. PATENT DOCUMENTS

| | | | | |
|---|---|---|---|---|
| 2014/0126746 A1* | 5/2014 | Shin | ................ | H04R 3/005 |
| | | | | 381/94.7 |
| 2014/0254816 A1* | 9/2014 | Kim | ................ | H04M 9/082 |
| | | | | 381/71.11 |
| 2015/0179184 A1* | 6/2015 | Cudak | ................ | G10L 21/0208 |
| | | | | 704/233 |
| 2015/0382047 A1 | 12/2015 | Van Os et al. | | |
| 2016/0098989 A1* | 4/2016 | Layton | ................ | G10L 25/84 |
| | | | | 704/233 |
| 2016/0125892 A1* | 5/2016 | Bowen | ................ | G10L 15/20 |
| | | | | 704/226 |
| 2016/0240210 A1* | 8/2016 | Lou | ................ | G10L 25/15 |
| 2016/0343371 A1* | 11/2016 | Sharifi | ................ | G06F 16/433 |
| 2017/0186463 A1* | 6/2017 | Prins | ................ | G10L 21/0364 |
| 2019/0043515 A1* | 2/2019 | Cohen | ................ | H04R 3/005 |
| 2019/0371330 A1* | 12/2019 | Lin | ................ | G10L 25/21 |

FOREIGN PATENT DOCUMENTS

| | | |
|---|---|---|
| EP | 2 965 496 B1 | 1/2018 |
| JP | 2013-187781 A | 9/2013 |
| JP | 2014-153663 A | 8/2014 |

\* cited by examiner

INFORMATION PROCESSING APPARATUS AND INFORMATION PROCESSING METHOD

TECHNICAL FIELD

The present technology relates to an information processing apparatus and an information processing method, and in particular, to an information processing apparatus and an information processing method which are capable of improving the accuracy of a voice interaction when the voice interaction is used during reproduction of a content.

CROSS REFERENCE TO RELATED APPLICATIONS

This application claims the benefit of Japanese Priority Patent Application JP 2017-097165 filed on May 16, 2017, the entire contents of which are incorporated herein by reference.

BACKGROUND ART

A broadcast application to be executed in conjunction with a broadcast content is proposed (e.g., see PTL 1). The use of the broadcast application enables display of, for example, information associated with a broadcast content.

In addition, a technique associated with voice recognition for analyzing a content of a user's speech (e.g., see PTL 2). For example, when this technique is applied to a television receiver or a mobile terminal device, an expression spoken by a user can be analyzed and processing can be executed in response to the speech.

CITATION LIST

Patent Literature

PTL 1: JP 2013-187781 A
PTL 2: JP 2014-153663 A

SUMMARY OF INVENTION

Technical Problem

Incidentally, a television receiver is generally operated using an accessory remote controller. However, in a case where an operation associated with a broadcast application is carried out when a content is reproduced, the remote controller is not necessarily suitable as operation means, and thus operation means using a voice interaction is required. In the case of using such a voice interaction, a content is reproduced during a user's speech, and thus a voice in the content becomes noise, which may lead to deterioration of the accuracy of the voice interaction.

The present technology has been made in view of the above-mentioned circumstances, and aims to improve the accuracy of a voice interaction when the voice interaction is used during reproduction of a content.

Solution to Problem

According to one exemplary embodiment the disclosure is directed to a system that acquires first audio data including a voice command captured by a microphone; identifies second audio data included in broadcast content corresponding to a timing at which the first audio data is captured by the microphone; extracts the second audio data from the first audio data to generate third audio data; converts the third audio data to text data corresponding to the voice command; and outputs the text data.

The first audio data may include the voice command and fourth audio data corresponding to the broadcast content captured by the microphone.

The system may be a server, and the server may be configured to acquire the first audio data over a network from an apparatus including the microphone.

According to another exemplary embodiment the disclosure is directed to a method performed by an information processing system, the method including: acquiring first audio data including a voice command captured by a microphone; identifying second audio data included in broadcast content corresponding to a timing at which the first audio data is captured by the microphone; extracting the second audio data from the first audio data to generate third audio data; converting the third audio data to text data corresponding to the voice command; and outputting the text data.

According to another exemplary embodiment the disclosure is directed to an electronic device including circuitry configured to: acquire first audio data including a voice command captured by a microphone and background noise based on a presentation of content to a user; transmit first audio data to a server system; and receive a response to the voice command from the server system, the response to the voice command being generated by the server system by removing the background noise from the first audio data based on content information provided by the electronic device.

According to another exemplary embodiment the disclosure is directed to a method performed by an electronic device, the method including: acquiring first audio data including a voice command captured by a microphone and background noise based on a presentation of content to a user; transmitting first audio data to a server system; and receiving a response to the voice command from the server system, the response to the voice command being generated by the server system by removing the background noise from the first audio data based on content information provided by the electronic device.

Advantageous Effects of Invention

According to the first and second aspects of the present technology, it is possible to improve the accuracy of a voice interaction when the voice interaction is used during reproduction of a content.

It should be noted that advantageous effects of the present disclosure are not limited to advantageous effects described herein and may be any advantageous effects described in the present disclosure.

DESCRIPTION OF EMBODIMENTS

Embodiments of the present technology will be described below with reference to the drawings. It should be noted that the following description is made in the following order.

1. Configuration of System
2. First Embodiment: Application-Interaction Voice Interaction Function
3. Second Embodiment: Function of Removing Noise due to Voice in Content
4. Modified Examples
5. Configuration of Computer 1. Configuration of System (Configuration Example of Voice Interaction System)

Figure 1:
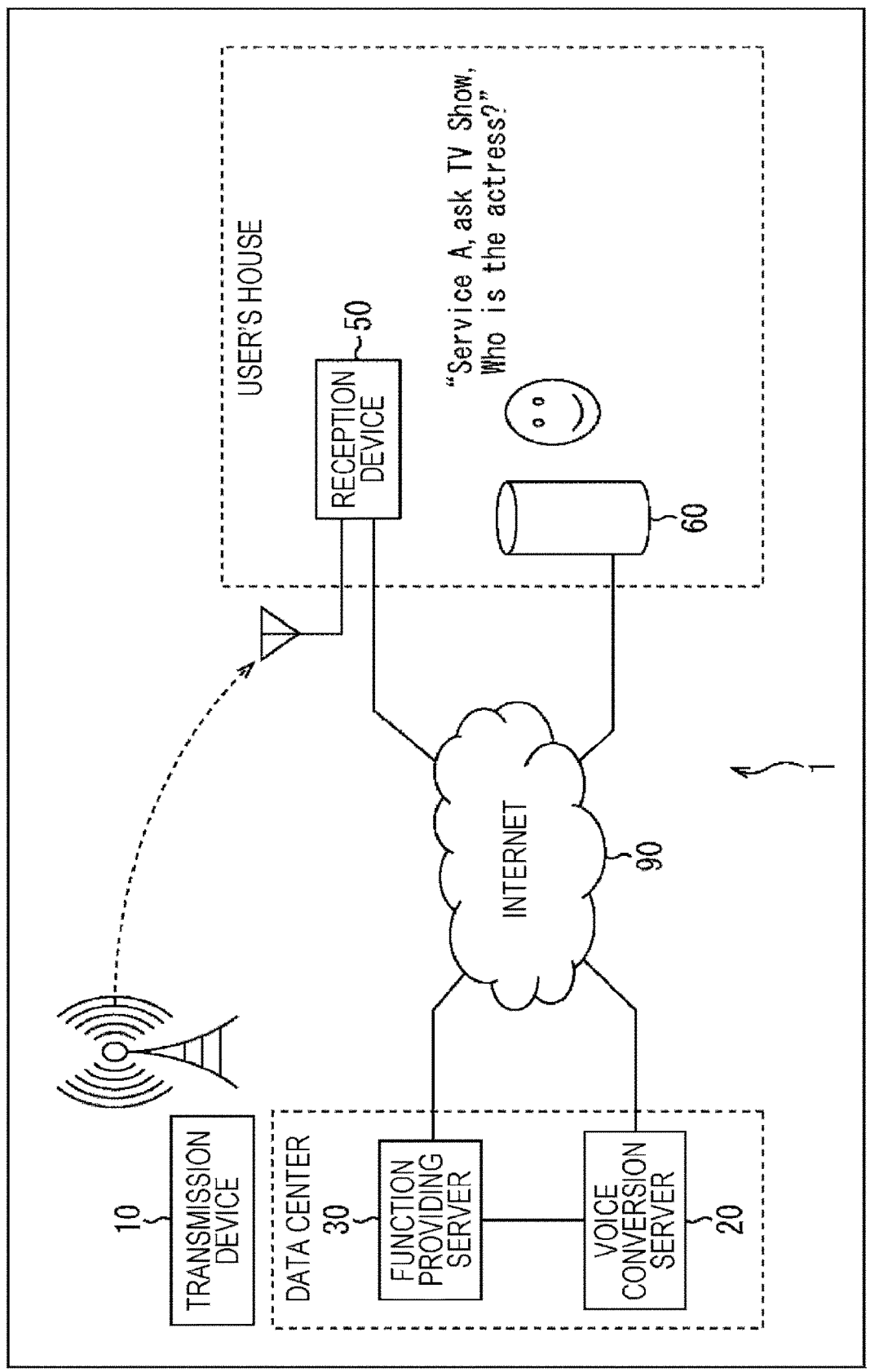
FIG. 1 is a block diagram illustrating a configuration example of an embodiment of a voice interaction system to which the present technology is applied.

FIG. 1 is a block diagram illustrating a configuration example of an embodiment of a voice interaction system to which the present technology is applied.

A voice interaction system 1 is a system for implementing a voice interaction with a user who is a viewer of a content. Referring to FIG. 1, the voice interaction system 1 includes a transmission device 10, a voice conversion server 20, a function providing server 30, a reception device 50, and a voice processing device 60.

Note that in the voice interaction system 1, the voice conversion server 20, the function providing server 30, the reception device 50, and the voice processing device 60 are connectable to the Internet 90 so that various data can be exchanged between them.

The transmission device 10 processes a broadcast content or a broadcast application, and transmits the processed broadcast content or application as a broadcast wave from an antenna installed in a transmitting station. Note that, for example, advanced television systems committee (ATSC) 3.0, which is one of the next-generation terrestrial broadcast standards, can be used as the broadcast system.

Examples of the broadcast content used herein include TV programs such as news, sports, dramas, or shopping channels. On the other hand, the broadcast application is an application developed using a script language such as a markup language, such as hypertext markup language 5 (HTML5), or JavaScript (registered trademark). Note that the detailed content of the broadcast application corresponding to ATSC3.0 is disclosed in NPL1 mentioned below.

Non Patent Literature 1: ATSC Candidate Standard ATSC 3.0 Interactive Content (A/344)

The voice conversion server 20 is a server that provides cloud-based voice recognition services. The voice conversion server 20 converts audio data transmitted from a device connected to the Internet 90 into text data, and transmits the text data to the function providing server 30.

The function providing server 30 is a server that provides various functions (functional services) by performing processing on the text data transmitted from the voice conversion server 20. The function providing server 30 transmits the processed data obtained by processing the text data to the reception device 50 or the voice processing device 60 via the Internet 90.

Examples of the functional services provided by the function providing server 30 include, for example, a voice interaction function with a user viewing a broadcast content. This voice interaction function is implemented in such a manner that the function providing server 30 executes a server application. Note that the server application is developed for each functional service. In addition, the voice conversion server 20 and the function providing server 30 are installed in a data center and are connectable to each other.

The reception device 50 and the voice processing device 60 arc installed in, for example, the same room or different rooms of a user's house.

The reception device 50 is configured as, for example, a fixed receiver such as a television receiver, a set top box (STB), a personal computer, or a game console, or a mobile receiver such as a smartphone, a cellular phone, or a tablet computer.

The reception device 50 receives the broadcast wave transmitted from the transmitting station and processes the received broadcast wave to reproduce the broadcast content, and outputs the video and voice. Further, the reception device 50 can execute the broadcast application obtained by processing the broadcast wave. In addition, the reception device 50 receives the processed data transmitted from the function providing server 30 via the Internet 90, and outputs the voice corresponding to the processed data.

The voice processing device 60 is, for example, a speaker that is connectable to a network, such as a domestic local area network (LAN), and is also referred to as a so-called smart speaker. The speaker of this type can reproduce music and perform, for example, a voice operation on a device such as lighting equipment or air-conditioning equipment. Note that the voice processing device 60 may be connected to various devices by wireless communication using a Bluetooth (registered trademark) or the like.

Further, the voice processing device 60 interacts with the voice conversion server 20 and the function providing server 30 via the Internet 90, thereby enabling provision of (a user interface for) a voice agent service to a user.

The voice agent service described herein refers to, for example, a function or service for appropriately responding or operating in response to a question or request by a spoken language by a combination of processing such as voice recognition processing and natural language processing.

Specifically, the voice processing device 60 is installed in a client side and functions as a user interface for the voice agent service. Further, the voice conversion server 20 and the function providing server 30 are installed in a server side such as a data center, and perform processing for implementing voice interaction function.

The voice processing device 60 collects the voice output from the user, and transmits the audio data to the voice conversion server 20 via the Internet 90. In addition, the voice processing device 60 receives the processed data transmitted from the function providing server 30 via the Internet 90, and outputs the voice corresponding to the processed data.

(Configuration Example of Transmission Device)

Figure 2:
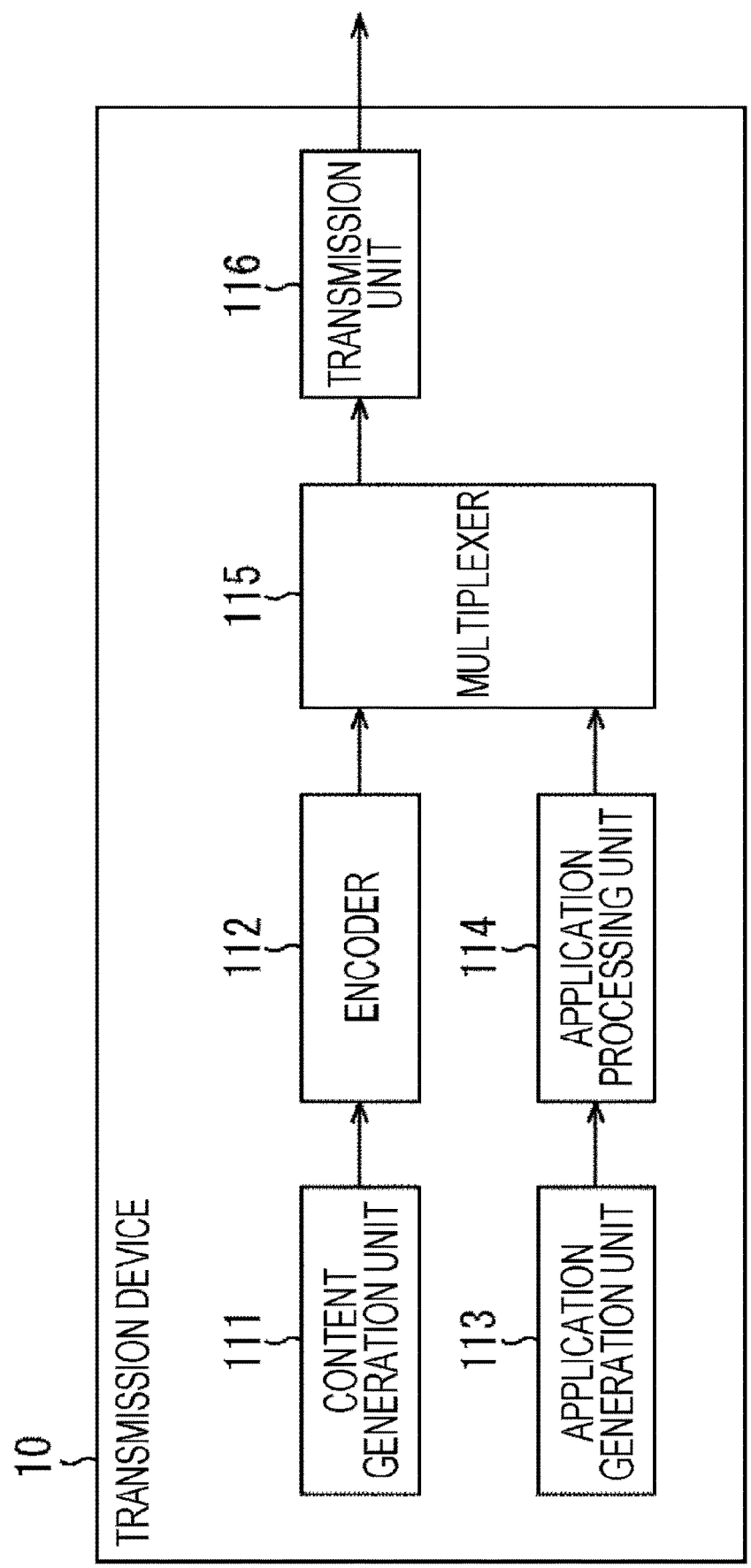
FIG. 2 is a block diagram illustrating a configuration example of a transmission device.

FIG. 2 is a block diagram illustrating a configuration example of the transmission device 10 illustrated in FIG. 1.

Referring to FIG. 2, the transmission device 10 includes a content generation unit 111, an encoder 112, an application generation unit 113, an application processing unit 114, a multiplexer 115, and a transmission unit 116.

The content generation unit 111 generates a broadcast content and supplies the generated broadcast content to the encoder 112. Note that the broadcast content may be acquired from an external server, a camera, a recording medium, or the like.

The encoder 112 encodes the audio data or video data constituting the broadcast content, which is supplied from the content generation unit 111, in accordance with a predetermined coding system, and supplies the encoded data to the multiplexer 115.

The application generation unit 113 generates a broadcast application and supplies the generated broadcast application to the application processing unit 114. Note that the broadcast application may be acquired from an external server, a recording medium, or the like.

The application processing unit 114 performs necessary processing on broadcast application data supplied from the application generation unit 113, and supplies the data obtained as a result of the processing to the multiplexer 115.

The multiplexer 115 multiplexes the data from the encoder 112 with the data from the application processing unit 114, and supplies a stream obtained as a result of the processing to the transmission unit 116.

The transmission unit 116 performs necessary processing (e.g., error correction coding processing or modulation processing) on the stream supplied from the multiplexer 115, and transmits the signal obtained as a result of the processing as a broadcast wave from an antenna installed in the transmitting station.

(Configuration Example of Server)

Figure 3:
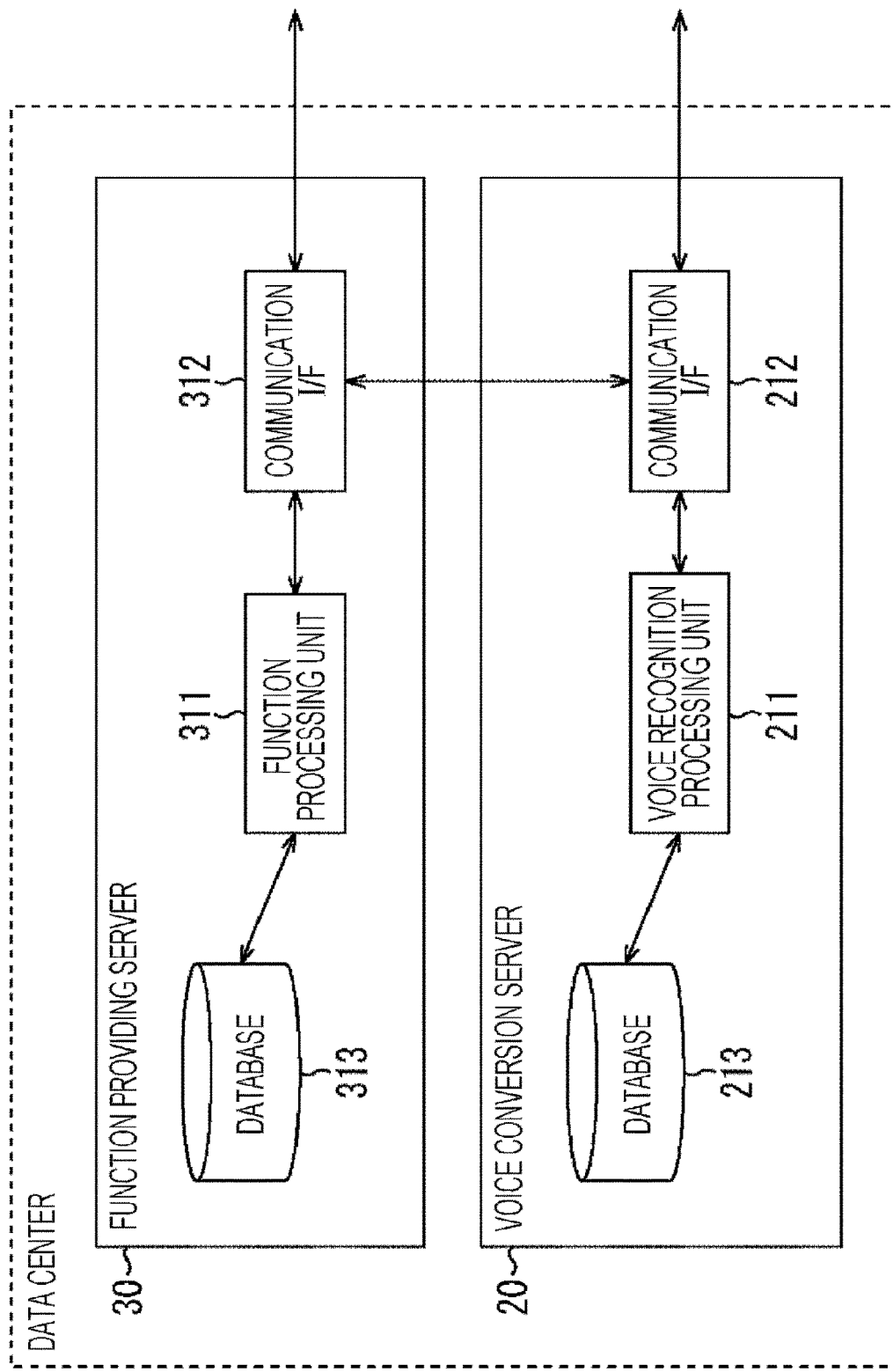
FIG. 3 is a block diagram illustrating configuration examples of a voice conversion server and a function providing server.

FIG. 3 is a block diagram illustrating configuration examples of the voice conversion server 20 and the function providing server 30 illustrated in FIG. 1.

Referring to FIG. 3, the voice conversion server 20 includes a voice recognition processing unit 211, a communication I/F 212, and a database 213.

The voice recognition processing unit 211 is configured as an arithmetic unit such as a central processing unit (CPU) or a microprocessor. Further, the communication I/F 212 includes, for example, a communication interface circuit. The database 213 is configured as a large-capacity recording device such as a hard disk drive (HDD) or a semiconductor memory.

The voice recognition processing unit 211 performs voice recognition processing for converting audio data into text data by referring to the database 213. In this case, for example, a huge amount of audio database is accumulated in the database 213, and the voice recognition processing unit 211 can convert the received audio data into text data by using a predetermined recognition algorithm.

Figure 4:
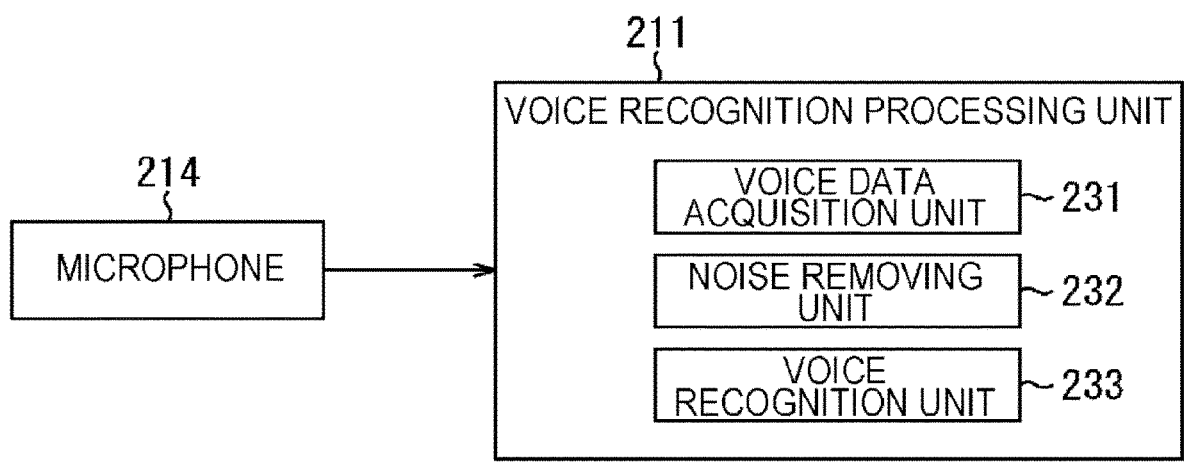
FIG. 4 is a block diagram illustrating a detailed configuration example of a voice recognition processing unit.

FIG. 4 illustrates a detailed configuration example of the voice recognition processing unit 211. As illustrated in FIG. 4, the voice recognition processing unit 211 includes an audio data acquisition unit 231, a noise removing unit 232, and a voice recognition unit 233.

The audio data acquisition unit 231 acquires audio data of the broadcast content reproduced by the server side, and supplies the acquired audio data to the noise removing unit 232.

Note that in the following description, the broadcast content to be reproduced by the server side is also referred to as a server-side reproduction content, and is distinguished from a broadcast content to be reproduced by the client-side reception device 50 (client-side reproduction content). The server-side reproduction content is reproduced by, for example, a reception device (a reception device 80 illustrated in FIG. 12 described below) which is installed in the data center.

Further, the voice in the server-side reproduction content is collected by a microphone 214, which is provided inside or outside of the voice conversion server 20, and the audio data is acquired by the audio data acquisition unit 231. Further, as dedicated sound collection device may be installed to collect the voice in the server-side reproduction content, and the audio data may be acquired by the audio data acquisition unit 231.

The noise removing unit 232 uses the audio data in the broadcast content (server-side content) supplied from the audio data acquisition unit 231, and performs noise removing processing on the audio data supplied from the communication I/F 212 to remove noise due to the voice in the broadcast content (client-side reproduction content) included in the audio data supplied from the voice processing device 60.

Note that in the following description, the audio data in the serer-side content is also referred to as content audio data. Also, the audio data that corresponds to the sound collected by the voice processing device 60 and is transmitted to the voice conversion server 20 via the Internet 90 is referred to as user audio data. Specifically, the user audio data includes noise due to the voice in the broadcast content (client-side reproduction content), as well as the voice of the user's speech.

The audio data from which noise is removed by the noise removing unit 232 is supplied to the voice recognition unit 233. Note that in the following description, the audio data from which the noise is removed is referred to as noise removed audio data.

The voice recognition unit 233 performs voice recognition processing by referring to the database 213, converts the noise removed audio data supplied from the noise removing unit 232 into text data, and supplies the text data to the communication I/F 212.

Note that the database 213 includes a voice or text corpus as a database for performing voice recognition processing. Such a corpus can include, for example, an acoustic model obtained by collecting sound waveform data, and a language model obtained by collecting information about words and the arrangement of the words. The voice recognition unit 233 performs sound processing using an acoustic model, or language processing using a language model, on the received audio data, thereby recognizing the voice. In this manner, the voice recognition processing includes sound processing, language processing and the like.

Referring again to FIG. 3, the communication I/F 212 receives the audio data (user audio data) transmitted from a device, such as the voice processing device 60, via the Internet 90, and supplies the received audio data to (the noise removing unit 232 of) the voice recognition processing unit 211. Further, the communication I/F 212 transmits the text data supplied from (the voice recognition unit 233 of) the voice recognition processing unit 211 to the function providing server 30.

In addition, referring to FIG. 3, the function providing server 30 includes a function processing unit 311, a communication I/F 312, and a database 313.

The function processing unit 311 is configured as an arithmetic unit such as a CPU or a microprocessor. On the other hand, the communication I/F 312 includes, for example, a communication interface circuit. The database 313 is configured as a large-capacity recording device such as a hard disk drive (HDD) or a semiconductor memory.

The function processing unit 311 executes a server application developed for each function, thereby performing processing for providing various functional services. For example, the function processing unit 311 executes a broadcast application including a voice interaction function (hereinafter referred to also as a TV Show function) for implementing a voice interaction with the user viewing the broadcast content), thereby performing processing associated with the voice interaction with the user viewing the broadcast content.

In this case, however, the broadcast application executed by the client-side reception device 50 interacts with the server application executed by the server-side function providing server 30, thereby obtaining reproduction information about the broadcast content to be reproduced. This enables the function processing unit 311 to perform interaction processing for making a response to the user's speech corresponding to the text data from the voice conversion server 20 on the basis of the interaction information narrowed down on the basis of the reproduction information in the interaction information included in the database 313.

Figure 5:
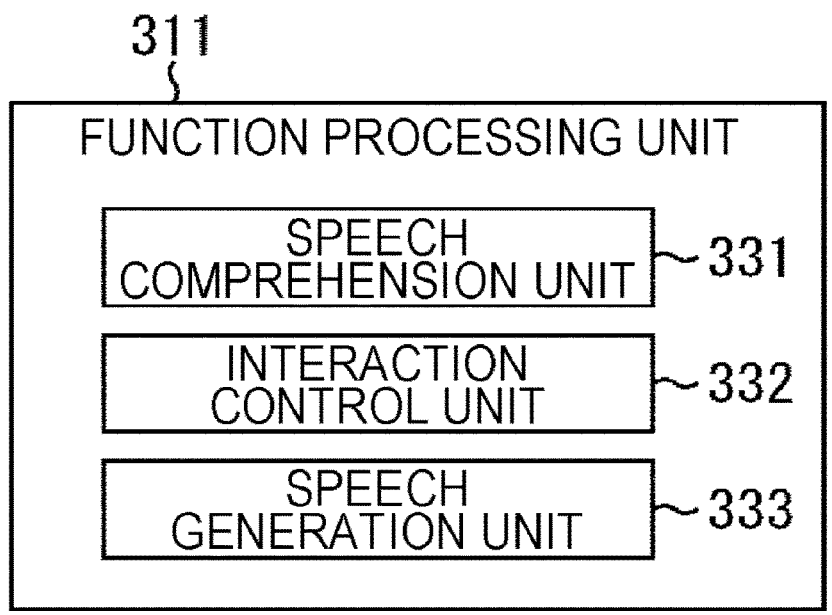
FIG. 5 is a block diagram illustrating a detailed configuration example of a function processing unit.

Herein, FIG. 5 illustrates a detailed configuration example of the function processing unit 311. As illustrated in FIG. 5, the function processing unit 311 includes a speech comprehension unit 331, an interaction control unit 332, and a speech generation unit 333.

The speech comprehension unit 331 analyzes the text data supplied from the voice conversion server 20 by referring to the database 313, and performs processing for comprehension a topic in consideration of the context of the topic, or the intent of a user's speech (language comprehension processing).

The interaction control unit 332 performs processing for determining what kind of response is to be made (interaction control processing) on the basis of results of the processing performed by the speech comprehension unit 331, the intent of a topic or a user's speech, a history of past interactions and the like, which are obtained by referring to the database 313.

The speech generation unit 333 performs processing (speech generation processing) for generating a speech (a response to a user's speech) depending on the user's intent on the basis of results of the processing performed by the interaction control unit 332 and information obtained by referring to the database 313.

Note that the database 313 can include, as a database for obtaining interaction information for implementing the interaction function, a knowledge database, a speech database, and databases for a speech history, user information, and the like.

Referring again to FIG. 3, the communication I/F 312 receives text data transmitted from the voice conversion server 20, and supplies the received text data to the function processing unit 311. Further, the communication I/F 312 receives reproduction information transmitted from the reception device 50 via the Internet 90, and supplies the received reproduction information to the function processing unit 311. Further, the communication I/F 312 transmits a response (a response to a user's speech) supplied from the function processing unit 311 to a device, such as the reception device 50 or the voice processing device 60, via the Internet 90.

(Configuration Example of Reception Device)

Figure 6:
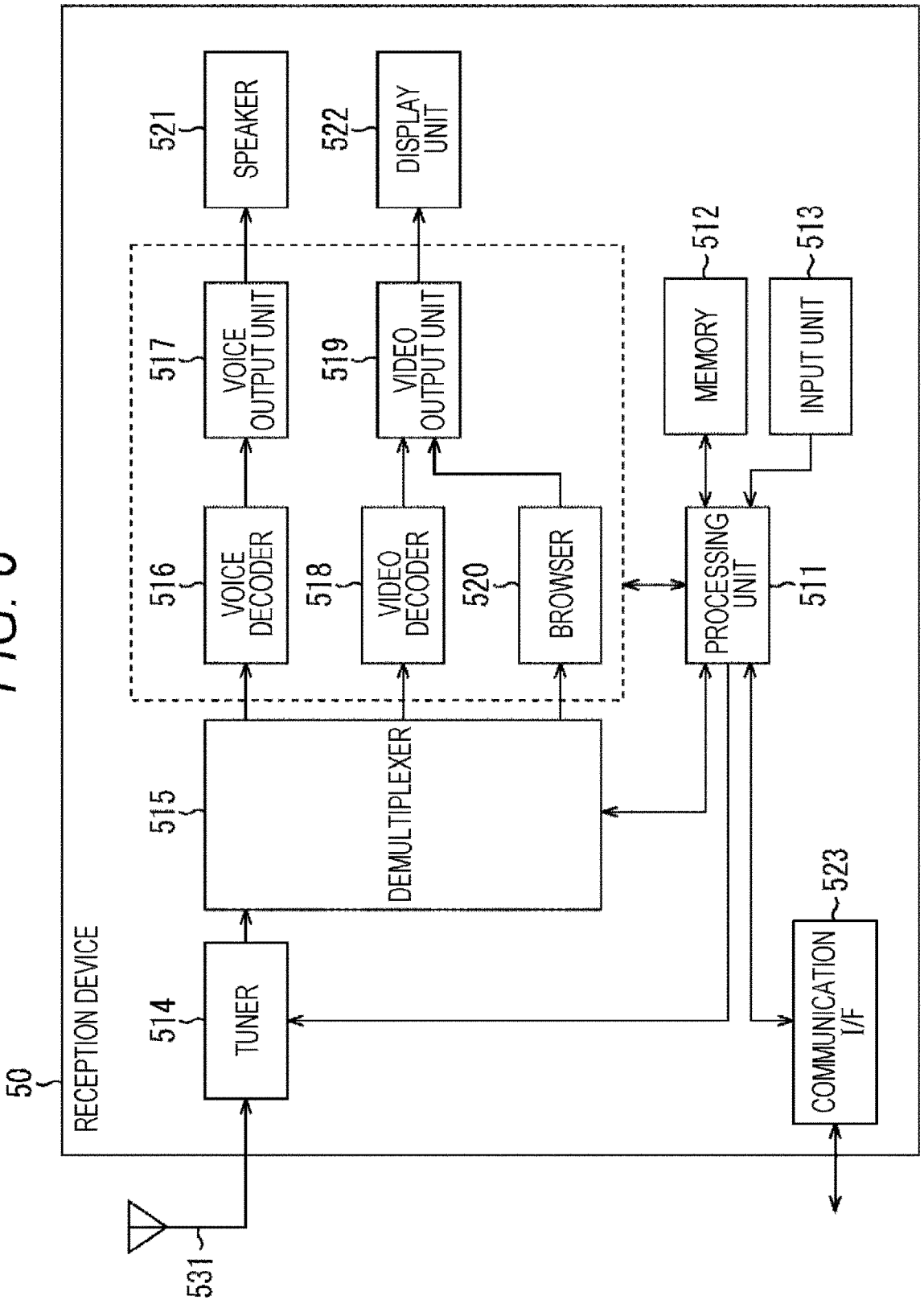
FIG. 6 is a block diagram illustrating a configuration example of a reception device.

FIG. 6 is a block diagram illustrating a configuration example of the reception device 50 illustrated in FIG. 1.

Referring to FIG. 6, the reception device 50 includes a processing unit 511, a memory 512, an input unit 513, a tuner 514, a demultiplexer 515, a voice decoder 516, a voice output unit 517, a video decoder 518, a video output unit 519, a browser 520, a speaker 521, a display unit 522, and a communication I/F 523.

The processing unit 511 includes, for example, a CPU or a microprocessor. The processing unit 511 operates as a central processing unit in the reception device 50 to perform various arithmetic processing, operation control of each unit, and the like. The processing unit 511 can exchange various data with each unit in the reception device 50.

The memory 512 is a non-volatile memory such as a non-volatile RAM (NVRAM) and is controlled by the processing unit 511 to record various data. The input unit 513 is, for example, a physical button, and supplies an operation signal corresponding to a user's operation to the processing unit 511. The processing unit 511 controls operations of each unit on the basis of the operation signal supplied from the input unit 513.

The tuner 514 receives the broadcast wave transmitted from the transmission device 10 through an antenna 531, performs necessary processing (e.g., demodulation processing or error correction decoding processing), and supplies a stream obtained as a result of the processing to the demultiplexer 515.

The demultiplexer 515 separates the stream supplied from the tuner 514 into audio data, video data, and broadcast application data. The demultiplexer 515 supplies the audio data to the voice decoder 516, supplies the video data to the video decoder 518, and supplies the broadcast application data to the browser 520.

The voice decoder 516 decodes the audio data supplied from the demultiplexer 515 in accordance with a predetermined decoding system, and supplies the decoded audio data to the voice output unit 517. The voice output unit 517 supplies the audio data supplied from the voice decoder 516 to the speaker 521. Thus, the voice of the broadcast content is output from the speaker 521.

The video decoder 518 decodes the video data supplied from the demultiplexer 515 in accordance with a predetermined decoding system, and supplies the decoded video data to the video output unit 519. The video output unit 519 supplies the video data supplied from the video decoder 518 to the display unit 522. Thus, the video of the broadcast content is displayed on the display unit 522 which is configured as a display such as a liquid crystal display (LCD) or an organic light emitting diode (OLED).

The browser 520 is, for example, a browser corresponding to HTML5 or JavaScript (registered trademark). The browser 520 is controlled by the processing unit 511 to process the broadcast application data supplied from the demultiplexer 515 and supply the processed broadcast application data to the video output unit 519. The video output unit 519 displays the application corresponding to the data supplied from the browser 520 in such a manner that the application is superimposed on the video corresponding to the video data supplied from the video decoder 518.

The communication I/F 523 includes, for example, a communication interface circuit. The communication I/F 523 is controlled by the processing unit 511 to access each server (e.g., the function providing server 30 illustrated in FIG. 1) which is connected to the Internet 90 and exchange various data.

(Configuration Example of Voice Processing Device)

Figure 7:
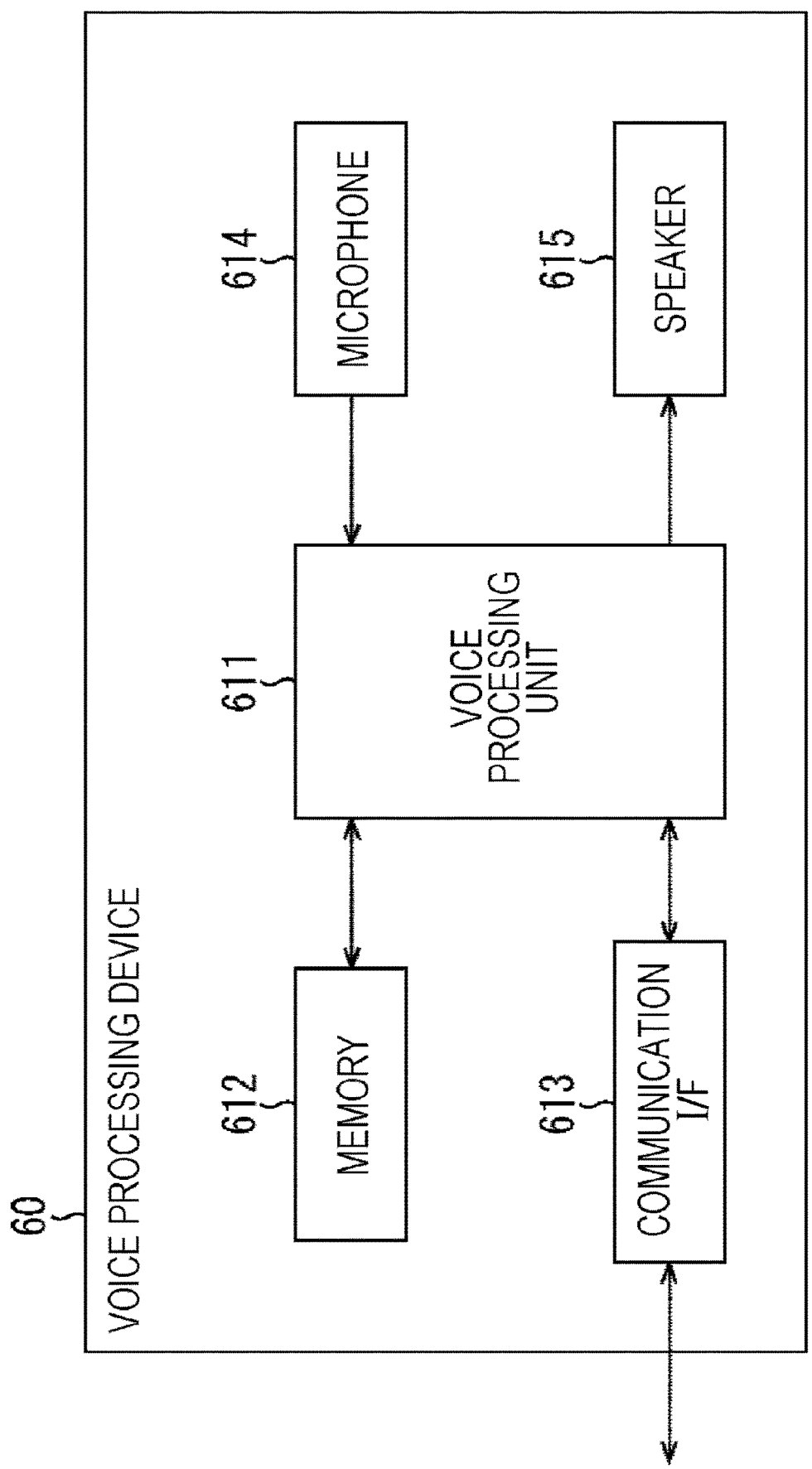
FIG. 7 is a block diagram illustrating a configuration example of a voice processing device.

FIG. 7 is a block diagram illustrating a configuration example of the voice processing device 60 illustrated in FIG. 1.

Referring to FIG. 7, the voice processing device 60 includes a voice processing unit 611, a memory 612, a communication I/F 613, a microphone 614, and a speaker 615.

The voice processing unit 611 includes, for example, a CPU or a microprocessor. The voice processing unit 611 operates as a central processing unit in the voice processing device 60 to perform various arithmetic processing, operation control of each unit, and the like.

The memory 612 is a non-volatile memory such as an NVRAM and is controlled by the voice processing unit 611 to record various data.

The communication I/F 613 includes, for example, a communication interface circuit. The communication I/F 613 is controlled by the voice processing unit 611 to access each server (e.g. the voice conversion server 20 and the function providing server 30 illustrated in FIG. 1) connected to the Internet 90 and exchange various data.

The microphone 614 is a device (microphone) for converting external sound into an electrical signal. The microphone 614 supplies the audio signal obtained by the conversion to the voice processing unit 611.

The voice processing unit 611 processes the audio signal supplied from the microphone 614 and supplies the processed audio signal to the communication I/F 613. Further, the voice processing unit 611 processes the audio signal supplied from the communication I/F 613 and supplies the processed audio signal to the speaker 615.

The speaker 615 is a device that outputs sound by converting the electrical signal into a physical vibration. The speaker 615 outputs the sound corresponding to the audio signal supplied from the voice processing unit 611.

The voice interaction system 1 has a configuration as described above.

Note that in the voice interaction system 1 illustrated in FIG. 1, for convenience of explanation, the case where one transmission device 10 and a pair of the voice conversion server 20 and the function providing server 30 are provided is illustrated. Alternatively, a plurality of transmission devices 10 and a plurality of function providing servers 30 may be provided for, for example, each carrier of a broadcasting station or the like.

Further, in the voice interaction system 1 illustrated in FIG. 1, the case where one reception device 50 and one voice processing device 60 are provided in a user's house is illustrated. Alternatively, for example, one reception device 50 and one voice processing device 60 may be provided for every plurality of user's houses.

2. First Embodiment

Incidentally, in the voice interaction system 1 illustrated in FIG. 1, the reception device 50 which is configured as a television receiver or the like can execute a broadcast application as well as a broadcast content. When a remote controller which is attached to a television receiver or the like is used to operate a broadcast application, however, some users may feel it difficult to operate the broadcast application.

Accordingly, in the present technology, the broadcast application executed by the client-side reception device 50 interacts with the server application executed by the server-side function providing server 30 to enable use of the user interface for the voice agent service provided by the voice processing device 60 in the broadcast application to be executed by the reception device 50, thereby improving the convenience of the operation.

Figure 8:
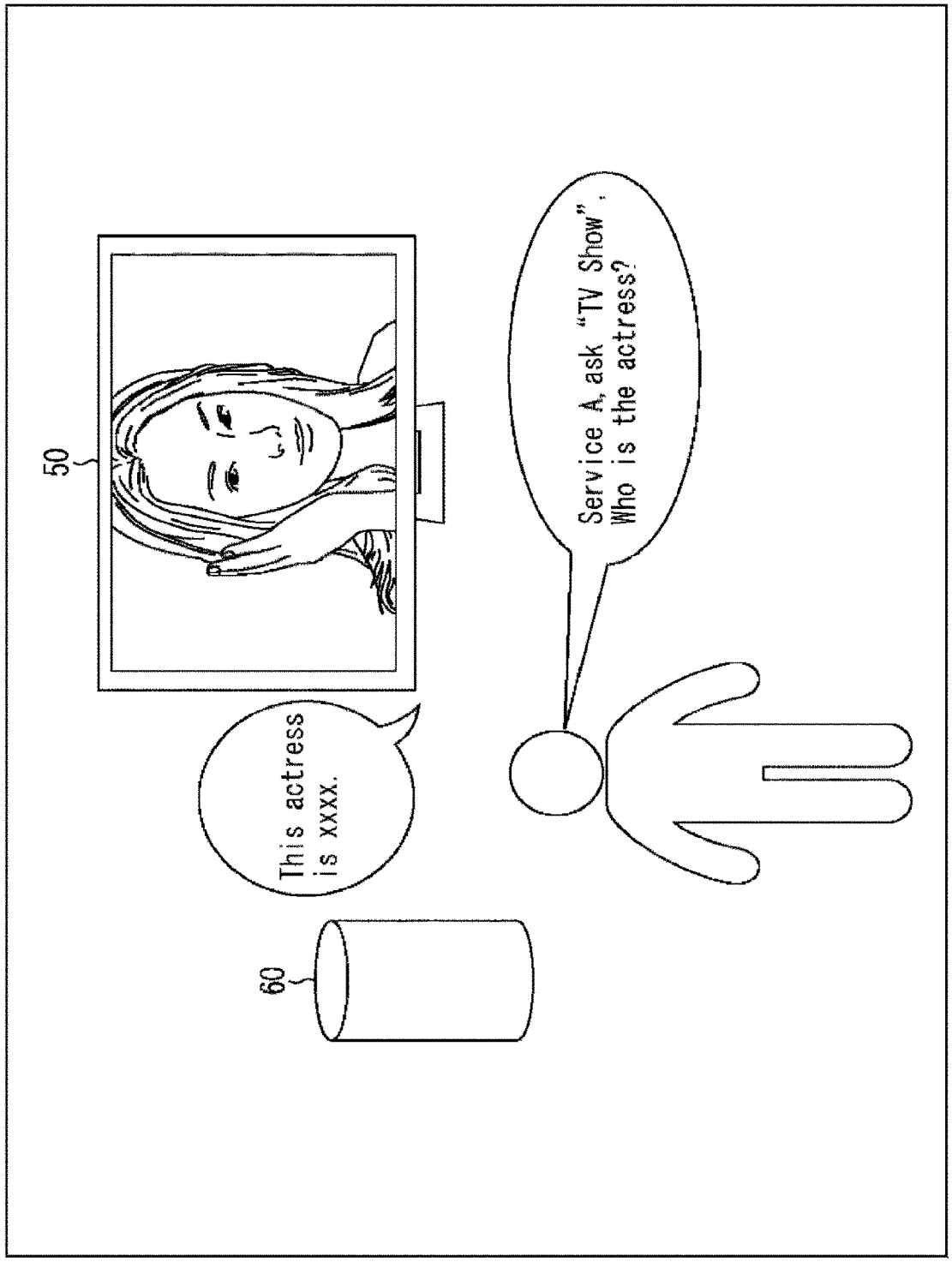
FIG. 8 is a diagram illustrating an outline of a first embodiment.

For example, as illustrated in FIG. 8, if a user viewing a drama wants to know the name of an actress in the drama as the broadcast content to be reproduced by the reception device 50, which is configured as a television receiver or the like, and the user has asked "Who is the actress?" on the spot, the name of the actress can be obtained as a response.

Specifically, the broadcast application executed by the reception device 50 interacts with the server application executed by the function providing server 30, so that the user interface for the voice agent service provided by the voice processing device 60 can be used. Accordingly, the question "Who is the actress?" from the user is received by the voice processing device 60, and is sent to the voice conversion server 20 and the function providing server 30 via the Internet 90.

In the voice conversion server 20 and the function providing server 30, the question from the user is processed to generate a response to the question. This response is transmitted to the reception device 50 via the Internet 90, and the broadcast application causes the speaker 521 to output the voice corresponding to the response "This actress is xxxx" ("xxxx" is the name of the actress). Thus, the user can know the name of the actress in the drama on the spot merely by speaking a question while viewing the drama.

Note that, while the example illustrated in FIG. 8 illustrates the case where the broadcast application outputs the voice corresponding to the response, the information output from the speaker 521 is not limited to a voice. In the reception device 50, text information, image information, or the like corresponding to the response may be displayed by the broadcast application on the screen of the display unit 522.

In addition, in the example illustrated in FIG. 8, the speaker 521 incorporated in the reception device 50 outputs the voice corresponding to the response, but instead the voice corresponding to the response may be output from the speaker 615 which is incorporated in the voice processing device 60. In this case, the processed data processed by the voice conversion server 20 and the function providing server 30 is transmitted to the voice processing device 60 via the Internet 90.

However, if the position where the reception device 50, such as a television receiver, is installed in a user's house, and the viewing position of the user viewing the broadcast content with respect to the installation position of the voice processing device 60 as a smart speaker arc taken into consideration, in general, it is highly likely that the user is located closer to the reception device 50 than the voice processing device 60 is. Accordingly, it is assumed that the speaker 521 of the reception device 50 is suitable for outputting the voice corresponding to the response in many cases.

Further, to activate the voice processing device 60 that functions as the user interface for the voice agent service, a predetermined keyword (referred to as an activation keyword) is generally used. In this case, "Service A" is set as an activation keyword for using the voice interaction function (TV Show function), the "Service A, ask TV Show Who is the actress?" from the user includes the activation keyword "Service A" and "ask TV Show" for specifying an interaction with the TV Show function.

(Voice Interaction Processing)

Next, a voice interaction processing flow to be executed by the voice interaction system 1 illustrated in FIG. 1 will be described with reference to flowcharts of FIGS. 9 and 10.

Figure 9:
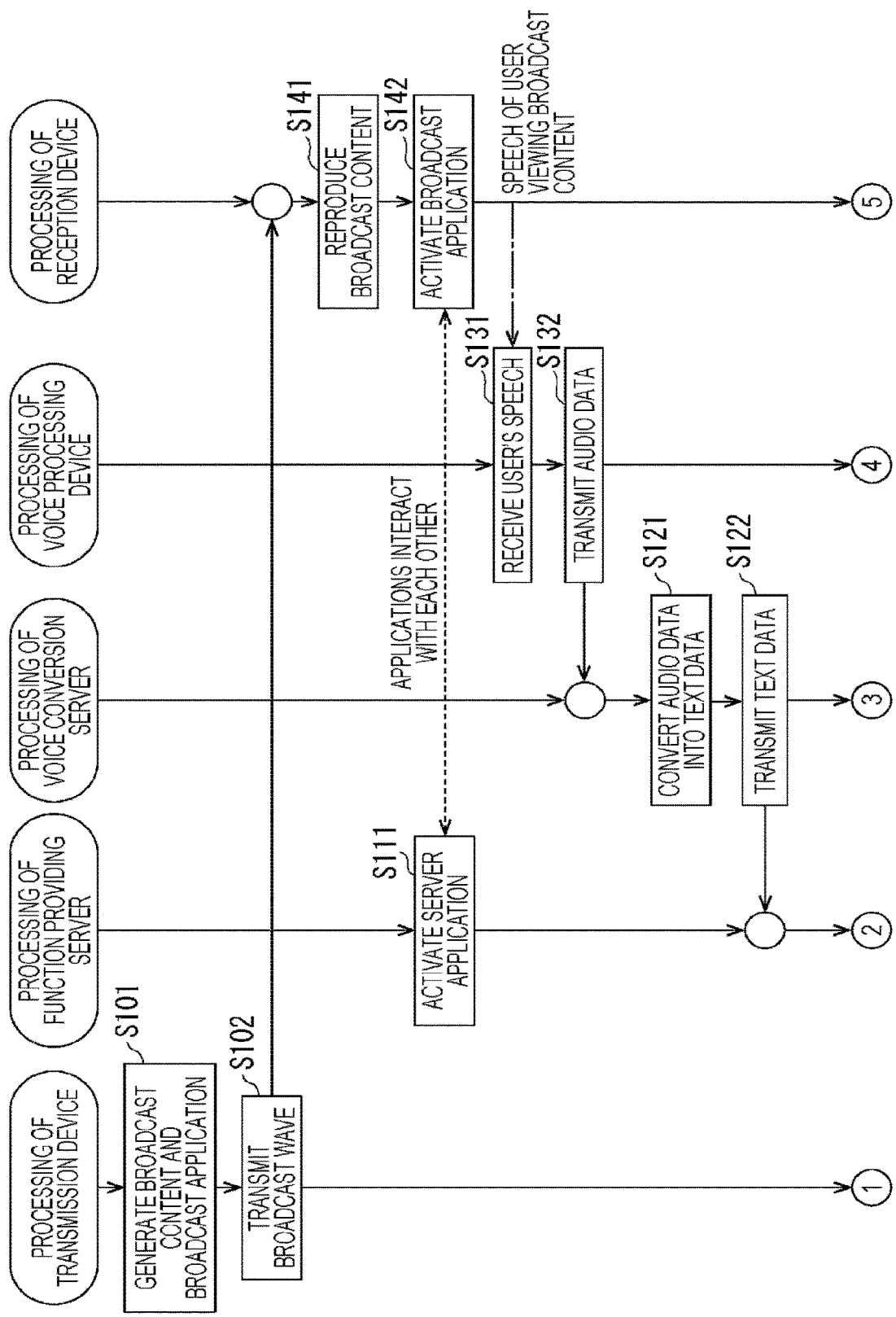
FIG. 9 is a flowchart illustrating a voice interaction processing flow.
Figure 10:
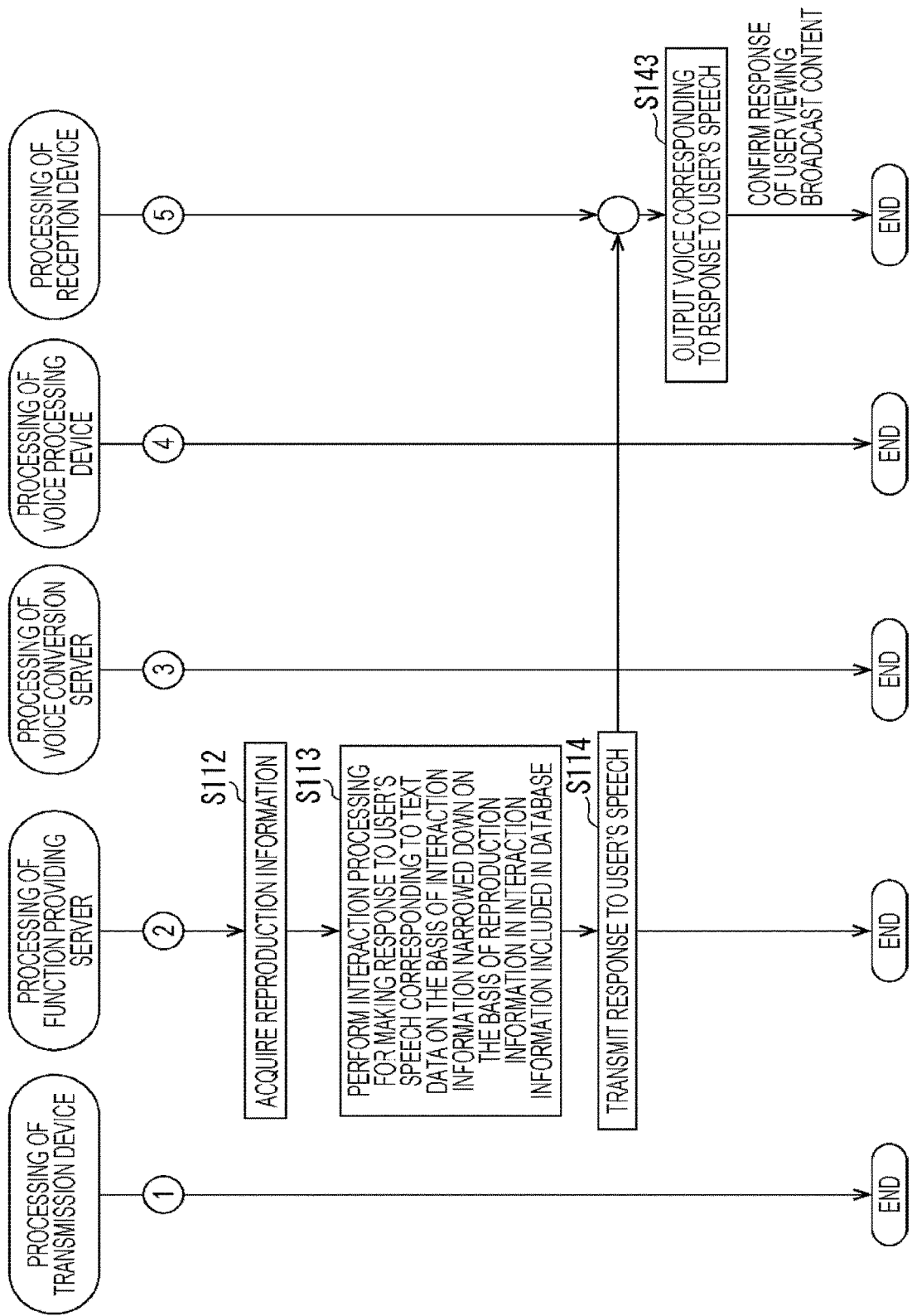
FIG. 10 is a flowchart illustrating a voice interaction processing flow.

Referring to FIGS. 9 and 10, however, the processing of steps S101 to S102 is executed by the transmission device 10 that is installed in facilities of a broadcasting station or a transmitting station, and the processing of steps S111 to S114 and the processing of steps S121 to S122 are executed by the function providing server 30 and the voice conversion server 20, respectively, which are installed in the data center.

Further, referring to FIGS. 9 and 10, the processing of steps S131 to S132 and the processing of steps S141 to S143 are executed by the voice processing device 60 and the reception device 50, respectively, which are installed in the user's house.

In step S101, the content generation unit 111 generates a broadcast content. Further, in step S101, the application generation unit 113 generates a broadcast application.

The broadcast content and the broadcast application that are generated in the processing of step S101 are subjected to predetermined processing, such as encoding, error correction coding processing, or modulation processing, and are then transmitted as a broadcast wave (broadcast signal) from the antenna installed in the transmitting station (S102).

The broadcast wave (broadcast signal) transmitted from the transmitting station is received by the antenna 531 which is connected to the reception device 50, and the processing of steps S141 to S142 is executed.

In the reception device 50, the tuner 514, the voice decoder 516, the video decoder 518, and the like perform predetermined processing, such as demodulation processing, error correction decoding processing, or decoding, on the broadcast wave received by the antenna 531, thereby reproducing the broadcast content (S141). In this case, for example, a TV program, such as a drama, is reproduced according to a user's program selection operation.

In addition, in the reception device 50, the broadcast application obtained from the broadcast wave is activated by the browser 520 (S142). This broadcast application operates in conjunction with the broadcast content. On the other hand, in the function providing server 30, the server application is activated by the function processing unit 311 (S111).

In this case, the broadcast application executed by the client-side reception device 50 and the server application executed by the server-side function providing server 30 interact with each other via the Internet 90, thereby enabling use of the user interface for the voice agent service provided by the voice processing device 60 in the broadcast application. Note that details of processing for allowing the broadcast application and the server application to interact with each other will be described below with reference to the flowchart of FIG. 11.

After that, in a case where the user viewing the broadcast content being reproduced by the reception device 50 speaks, the user's speech is received by the voice processing unit 611 of the voice processing device 60 that functions as the user interface for the voice agent service (S131).

For example, when the user has asked a question about the name of an actress in the drama being viewed by the user, the voice corresponding to the question (e.g., "Who is the actress?") is collected by the microphone 614, is converted into an electrical signal, and is supplied to the voice processing unit 611, so that the user's question is received.

Note that as described above, in practice, the user needs to say an activation keyword such as "TV Show" when the user makes a question. However, the description thereof is omitted herein for simplicity of explanation. The activation keyword will be described in detail below.

The audio data on the user's speech received as described above is transmitted by the communication I/F 613 of the voice processing device 60 to the voice conversion server 20 via the Internet 90 (S132).

The audio data transmitted from the voice processing device 60 is received by the voice conversion server 20 via the Internet 90, and the processing of steps S121 to S122 is executed.

In step S121, the voice recognition processing unit 211 performs voice recognition processing by referring to the database 213, and converts the audio data from the voice processing device 60 into text data. The text data obtained by the conversion processing in step S121 is transmitted to the function providing server 30 (S122). The text data from the voice conversion server 20 is received by the function providing server 30 and the processing of steps S112 to S114 is executed.

In step S112, the function processing unit 311 acquires reproduction information. In this case, since the broadcast application and the server application interact with each other, the reproduction information from the broadcast application can be acquired by the server application. Examples of the reproduction information include an identifier of a broadcast content, a reproduction time position, and information about a broadcast content being viewed by the user, such as a language of a voice or a caption.

In step S113, the function processing unit 311 performs interaction processing for making a response (a response to a user's speech) depending on the text data from the voice conversion server 20 on the basis of the interaction information narrowed down on the basis of the reproduction information acquired by the processing in step S112 in the interaction information included in the database 313.

For example, when the user viewing a drama wants to know the name of an actress in the drama and asks a question "Who is the actress?", the voice of the question is received by the voice processing device 60 and transmitted to the voice conversion server 20 via the Internet 90. In the voice conversion server 20, the audio data indicating the question "Who is the actress?" is converted into text data and transmitted to the function providing server 30.

On the other hand, in the function providing server 30, information indicating an identifier for identifying the drama being viewed by the user, a reproduction time position, or a language of a voice or a caption is acquired as reproduction information. Further, (the function processing unit 311 of) the function providing server 30 narrows down a huge amount of database accumulated in the database 313 on the basis of the reproduction information, thereby making it possible to limit the range of interaction information for implementing the voice interaction function to a time zone in which the drama being viewed by the user is scheduled.

Note that various means can be used for the interaction processing to be performed herein. For example, the following means can be used.

Specifically, in the function processing unit 311, first, the speech comprehension unit 331 analyzes the text data supplied from the voice conversion server 20 and the intent of the topic or user's speech is comprehended in consideration of the context thereof. Next, the interaction control unit 332 determines what kind of response is to be made on the basis of the intent of the topic or user's speech, which is comprehended by the speech comprehension unit 331, the history of past interactions, and the like. Lastly, the speech generation unit 333 generates a speech (a response to the user's speech) depending on the user's intent on the basis of the determination result by the interaction control unit 332.

In this case, the speech comprehension unit 331 to the speech generation unit 333 carry out processing by referring to the database 313. Since the interaction information included in the database 313 is narrowed down on the basis of the reproduction information, the interaction processing based on the limited interaction information can be carried out.

In this case, the database 313 can include, as a database for obtaining interaction information for implementing the voice interaction function, the knowledge database and the speech database, as well as databases for the speech history, user information, and the like. Note that the interaction processing illustrated herein is merely an example and known interaction processing techniques may be used.

The response (response to the user's speech) obtained as described above is transmitted to the reception device 50 via the Internet 90 by the communication I/F 312 of the function providing server 30 (S114).

A response transmitted from the function providing server 30 is received by the reception device 50 via the Internet 90, and the processing of step S143 is executed. Specifically, (the broadcast application executed by) the reception device 50 outputs, from the speaker 521, the voice corresponding to the response from the function providing server 30 (the response corresponding to the user's speech) (S143).

For example, when the user has asked the name of an actress in the drama being viewed by the user, a voice corresponding to a response "This actress is xxxx" ("xxxx" is the name of the actress) is output as a response to the question (e.g., a question "Who is the actress?"). This enables the user viewing the drama to know the name of the actress in the drama.

Note that, as described above, the reception device 50 may display information corresponding to the response from the function providing server 30 on the screen of the display unit 522. Further, the voice corresponding to the response from the function providing server 30 may be output from the speaker 615 of the voice processing device 60.

In addition, the above descriptions illustrate a case where the reproduction information, such as the identifier of the broadcast content, is notified by the broadcast application interacting with the server application in the processing of step S112 illustrated in FIG. 10. Alternatively, the reproduction information may be notified by a resident application of the reception device 50, or a broadcast application may be set using an application programming interface (API) which is provided by the reception device 50 to notify. In short, any notification means may be used as long as the server application can acquire the reproduction information. Note that the resident application is an application that is incorporated in the reception device 50 in advance.

The voice interaction processing flow has been described above.

(Application-Interaction Processing)

Next, application-interaction processing corresponding to the processing of steps S111 and S142 illustrated in FIG. 9 will be described with reference to the flowchart of FIG. 11.

Figure 11:
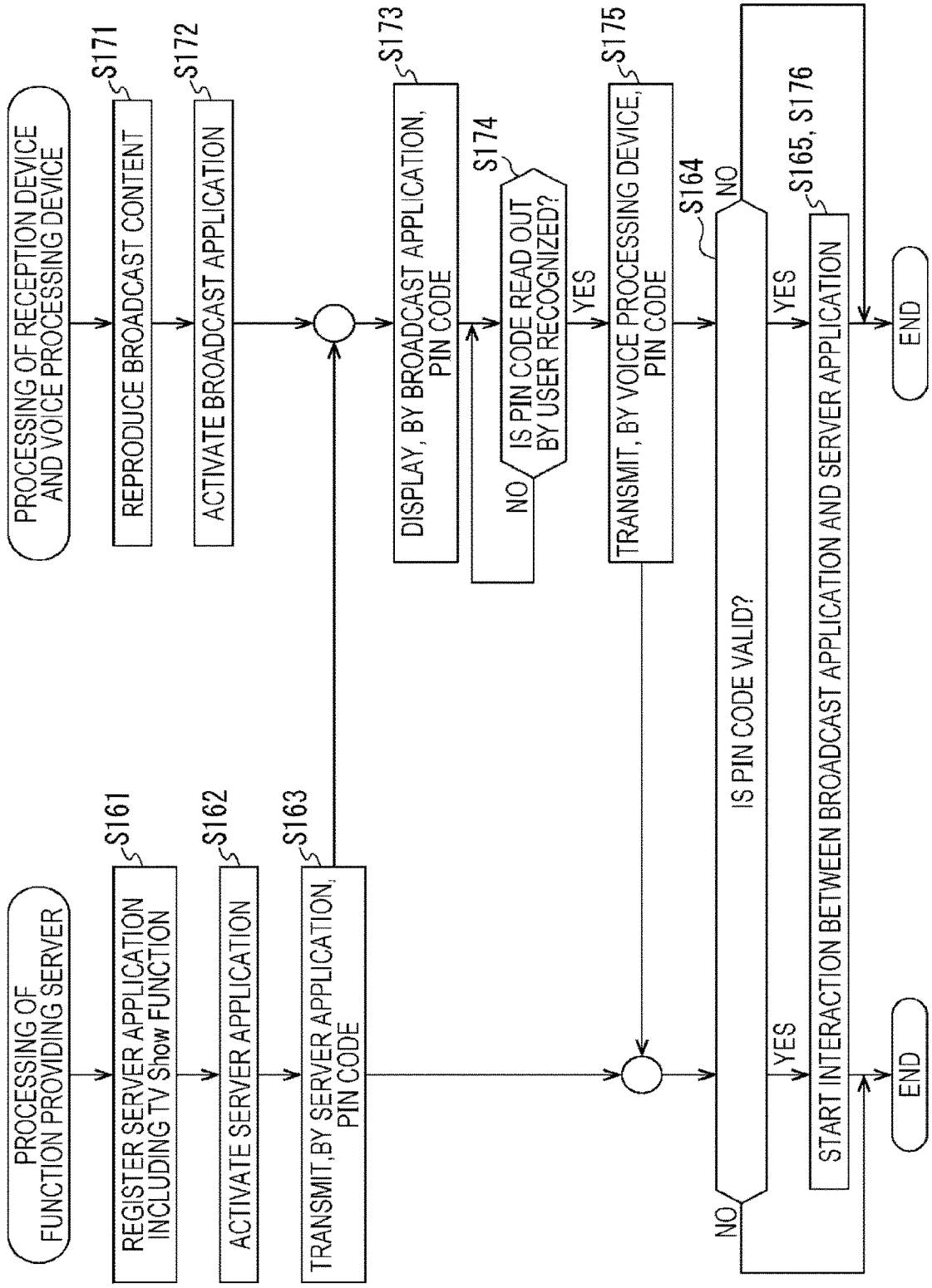
FIG. 11 is a flowchart illustrating an application-interaction processing flow.

Referring to FIG. 11, however, the processing of steps S161 to S165 is executed by the function providing server 30 that is installed in the data center. Further, the processing of steps S171 to S176 is executed by the reception device 50 or the voice processing device 60 installed in the user's house.

In the function providing server 30, when the function processing unit 311 registers the server application including the TV Show function as the server application using the voice agent service (S161), the server application is activated (S162).

On the other hand, in the reception device 50, the broadcast content is reproduced (S171), and the broadcast application is activated (S172).

Thus, in a state where the server application is activated in the server-side function providing server 30 and the broadcast application is activated in the client-side reception device 50, the server application generates a personal identification number (PIN) code and transmits the generated PIN to the broadcast application via the Internet 90 (S163). The (text data of) PIN code is received by the reception device 50.

In the reception device 50, the broadcast application displays the PIN code from the server application on the display unit 522 (S173). Thus, the user who has confirmed the PIN code displayed on the screen of the reception device 50 reads out the PIN code.

In this case, however, the PIN code is read out together with a predetermined keyword (command word), such as "Service A ask TV Show to activate PIN **" (**: displayed PIN code), thereby making it possible to recognize the PIN code read out by the user in the voice agent service side, for example.

In the voice processing device 60, the voice processing unit 611 determines whether the PIN code read out by the user has been able to be recognized (S174). In step S174, if it is determined that the PIN code has not be recognized, the determination processing in step S174 is repeated. In the voice processing device 60, if the PIN code is not recognized, the user reads out the PIN code again.

In step S174, then, if it is determined that the PIN code has been able to be recognized, the processing proceeds to step S175. In step S175, the communication I/F 613 of the voice processing device 60 transmits the audio data of the PIN code, which is read out by the user, via the Internet 90.

Note that, although not described, for simplicity of explanation, the audio data of the PIN code from the voice processing device 60 is transmitted to the voice conversion server 20 and the audio data is converted into text data. The text data of the PIN code obtained as described above is received by the function providing server 30.

In the function providing server 30, the function processing unit 311 performs a collation by comparing (the text data of) the PIN code transmitted to the broadcast application with (the text data of) the PIN code transmitted from the voice processing device 60, thereby determining whether the PIN code from the voice processing device 60 is valid (S164).

In step S165, in a case where it is determined that the PIN code from the voice processing device 60 is valid, the processing proceeds to step S165 (S176). In step S165 (S176), the interaction between the broadcast application activated by the client-side reception device 50 and the server application activated by the server-side function providing server 30 is started.

Thus, the broadcast application to be delivered to an unspecified user is associated with an attribute of a specific user who uses the broadcast application. Specifically, the server application notifies the reception device 50, which executes the broadcast application, of known identification information (PIN code), and receives a speech by a specific user who has confirmed the notified identification information (PIN code) by using the voice user agent service, thereby associating the attribute of the specific user.

When the interaction of the applications is started as described above, the processing of steps S111 and S142 illustrated in FIG. 9 and subsequent processing can be executed.

Note that in step S164, in a case where it is determined that the PIN code from the voice processing device 60 is not valid, the processing of step S165 (S176) is omitted, and the broadcast application does not interact with the server application.

The application-interaction processing flow has been described above.

Note that FIG. 11 illustrates a processing sequence in which the PIN code from the function providing server 30 is displayed on the reception device 50, such as a television receiver, to cause the user to read out the PIN code, and the audio data of the PIN code is sent from the voice processing device 60. Alternatively, another notification means may be used as means for notifying the PIN code.

For example, unlike the processing flow illustrated in FIG. 11 described above, the audio data (or text data) of the PIN code from the function providing server 30 is sent to the voice processing device 60 via the Internet 90, and the voice corresponding to the PIN code is set to be output by the voice processing device 60. Then the PIN code corresponding to the voice may be input to the broadcast application to be executed by the reception device 50. The PIN code input to the broadcast application is received by the server application via the Internet 90, and is used for collation processing of the PIN code (S164).

Also, various processing sequences can be used as the processing sequence for application-interaction processing. For example, the PIN code from the function providing server 30 may be displayed on a mobile terminal device, such as a smartphone, which is owned by the user, or the PIN code may be input from a mobile terminal device, such as a smartphone, and sent as text data, instead of causing the user to read out the PIN code.

Note that the application-interaction processing as illustrated in FIG. 11 need not necessarily performed every time the broadcast application is activated in the reception device 50. For example, the interaction of the applications can be implemented by performing the following processing, without carrying out the processing illustrated in FIG. 11. Specifically, when it is confirmed that the PIN code is valid in the processing of step S164 illustrated in FIG. 11, the function providing server 30 causes to record token information by using a mechanism, such as browser Cookie. Thus, in a case where the same broadcast application communicates with the function providing server 30 in the next processing or subsequent processing, the interaction of the applications is implemented by using the recorded token information, without carrying out the processing illustrated in FIG. 11.

The first embodiment has been described above. In the first embodiment, the broadcast application executed by the client-side reception device 50 and the server application executed by the server-side function providing server 30 interact with each other via the Internet 90, thereby enabling the use of the user interface of the voice agent service provided by the voice processing device 60 in the broadcast application executed by the reception device 50.

Then, in the function providing server 30, a huge amount of database accumulated in the database 313 is narrowed down using the reproduction information obtained from the broadcast application interacting with the server application when the interaction processing with the user viewing the broadcast content is performed, and then the interaction processing is carried out on the basis of the interaction information narrowed down on the basis of the reproduction information.

For example, in the function providing server 30, when data on TV programs for all channels of each broadcasting station is accumulated as the knowledge database in the database 313, an actress playing in which TV program in which time zone cannot be specified merely by receiving a question about the name of the actress, and thus it is difficult to make an appropriate response.

On the other hand, if the data in the knowledge database can be narrowed down on the basis of the reproduction information from the broadcast application executed by the reception device 50 and the interaction processing can be carried out on the basis of the interaction information narrowed down on the basis of the reproduction information, an actress playing in which TV program in which time zone can be specified. Therefore, an appropriate response can be made only by receiving a question about the name of the actress.

Thus, according to the present technology, during reproduction of a content, the broadcast application and the server application interact with each other, thereby enabling use of the user interface for the voice agent service. Consequently, the convenience of the operation can be improved using a voice interaction. Further, in the function providing server 30, the reproduction information is used for performing the interaction processing, thereby enabling an appropriate voice interaction with the user viewing a broadcast content.

3. Second Embodiment

As described above, in the voice interaction system 1 illustrated in FIG. 1, the voice processing device 60 that functions as the user interface for the voice agent service receives a user's speech. It is assumed that, however, voices collected by the microphone 614 of the voice processing device 60 include not only the voice of the user's speech, but also noise due to the voice of the broadcast content reproduced by the reception device 50.

Specifically, in the voice interaction system 1 illustrated in FIG. 1, the user viewing the broadcast content reproduced by the reception device 50 performs a voice interaction, such as making a question about the broadcast content. During the voice interaction, the reception device 50 outputs the voice in the broadcast content being reproduced. Accordingly, the voices collected by the microphone 614 of the voice processing device 60 include noise due to the voice in the broadcast content.

If such noise is included, the voice conversion server 20 and the function providing server 30 which process the audio data from the voice processing device 60 erroneously recognize the voice in the broadcast content, instead of recognizing the voice of the user's speech, which may cause a malfunction in the interaction processing. In particular, the voice in the broadcast content reproduced by the reception device 50 is a voice of a person's speech in many cases, which leads to an increase in the possibility of erroneous recognition.

Accordingly, in the present technology, the broadcast application executed by the client-side reception device 50 and the server application executed by the server-side function providing server 30 interact with each other, thereby enabling the server side to remove noise due to the voice in the broadcast content reproduced by the reception device 50 from the audio data (user audio data) from the voice processing device 60, and to use the audio data for the interaction processing only on the voice of the user's speech.

Figure 12:
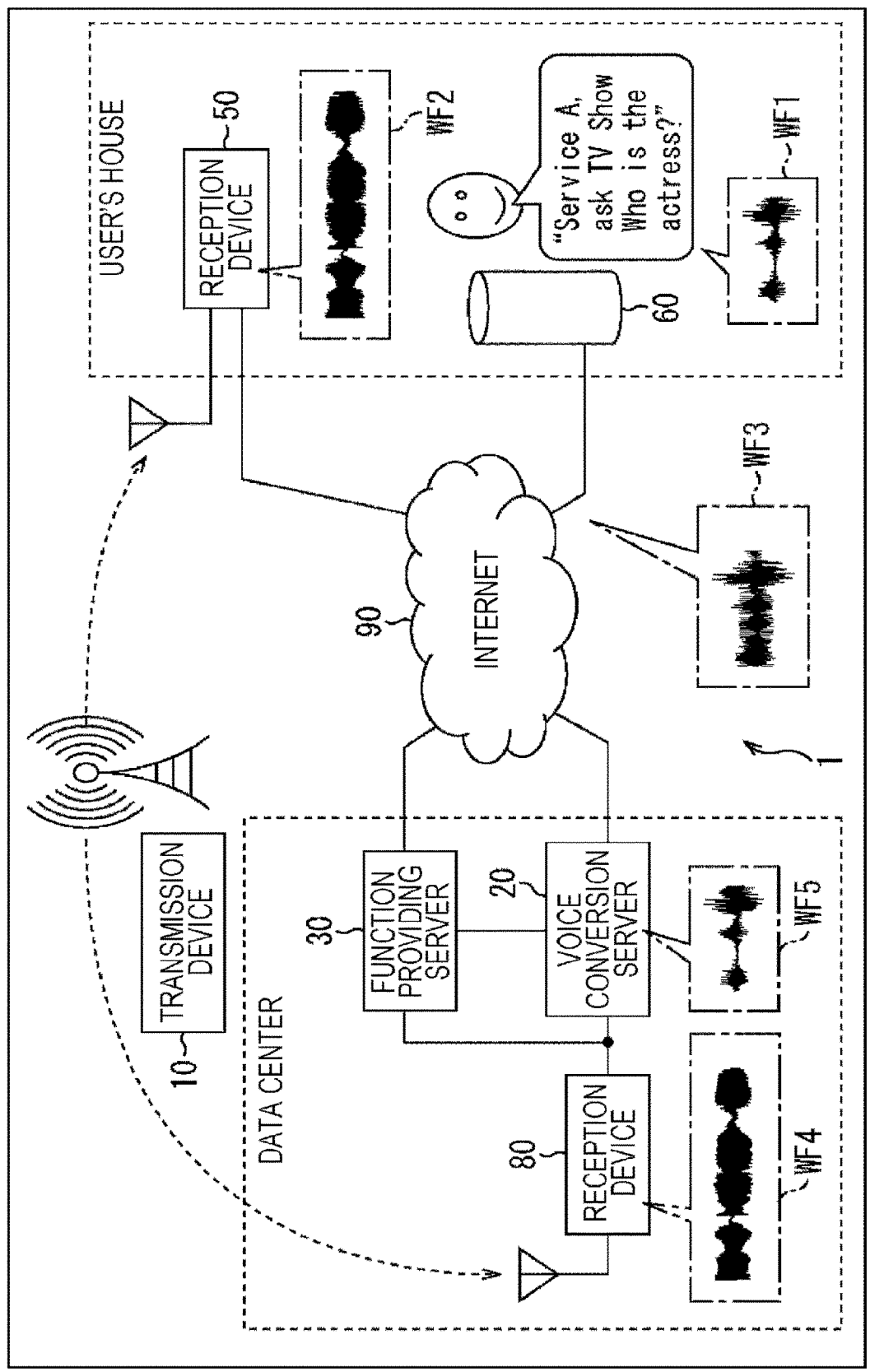
FIG. 12 is a diagram illustrating an outline of a second embodiment.

Herein, FIG. 12 illustrates waveforms of the audio signal in a case where, in the voice interaction system 1, when the user viewing a drama wants to know the name of an actress in the drama as the broadcast content reproduced by the reception device 50, which is configured as a television receiver or the like, and the user has asked a question "Who is the actress?" on the spot.

Specifically, in a case where the user has asked a question "Who is the actress?", the voices collected by the microphone 614 of the voice processing device 60 include not only the voice corresponding to the question made by the user, but also the voices in the drama output from the speaker 521 of the reception device 50. Accordingly, a voice waveform WF3 of a voice collected by the microphone 614 is a combination of a voice waveform WF1 corresponding to the user's question and a voice waveform WF2 corresponding to the voices in the drama.

The audio data having the voice waveform WF3 is sent from the voice processing device 60 to the voice conversion server 20 via the Internet 90. Then, although the voice conversion server 20 performs the voice recognition processing, (the voice waveform WF3 of the voice corresponding to) the audio data from the voice processing device 60 includes (the voice waveform WF2 corresponding to) the voices in the drama as noise. Therefore, the voice recognition processing is carried out after the noise is removed.

In this case, in the voice interaction system 1 illustrated in FIG. 12, the reception device 80 (e.g., a television receiver) provided in the server side is set to reproduce the broadcast content (drama) that is the same as that in the reception device 50, and the audio data on (a voice waveform WF4 corresponding to) the voices in the drama is set to be acquired by the voice conversion server 20. Specifically, the voice waveform WF4 of the voice in the broadcast content (server-side reproduction content) reproduced by the server-side reception device 80 has substantially the same shape as that of the voice waveform WF2 of the voice in the broadcast content (client-side reproduction content) reproduced by the client-side reception device 50.

In this case, however, the broadcast application executed by the client-side reception device 50 and the server application executed by the server-side function providing server 30 interact with each other, thereby obtaining the reproduction information (e.g., channel number) about the broadcast content to be reproduced. Thus, in the server-side reception device 80, a predetermined channel is selected on the basis of the reproduction information, such as a channel number, so that the broadcast content (drama) that is the same as that in the client-side reception device 50 can be reproduced.

Further, in the voice conversion server 20, (the voice waveform WF3 of the voice corresponding to) the audio data from the voice processing device 60 is processed using (the voice waveform WF4 of) the voice in the broadcast content reproduced by the reception device 80, thereby removing noise which is due to the voice in the broadcast content and included in the audio data from the voice processing device 60.

Execution of such noise removing processing enables the voice conversion server 20 to obtain (a voice waveform WF5 corresponding to) the audio data from which noise due to the voice in the broadcast content (client-side reproduction content) is removed.

Specifically, in the voice conversion server 20, (the voice waveform WF3 of the voice corresponding to) the audio data from the voice processing device 60 is separated into (the voice waveform WF5 of the voice corresponding to) the audio data on the user's speech and (the voice waveform WF4 of the voice corresponding to) the voice in the broadcast content. In this case, the voice waveform WF5 of the voice corresponding to the audio data (noise removed audio data) obtained by the noise removing processing has substantially the same shape as that of the voice waveform WF1 corresponding to the question made by the user viewing the broadcast content reproduced by the reception device 50.

Further, the voice conversion server 20 converts the noise removed audio data into text data, and transmits the text data to the function providing server 30. Herein, FIG. 13 illustrates the outline of the processing performed by the voice conversion server 20.

Figure 13:
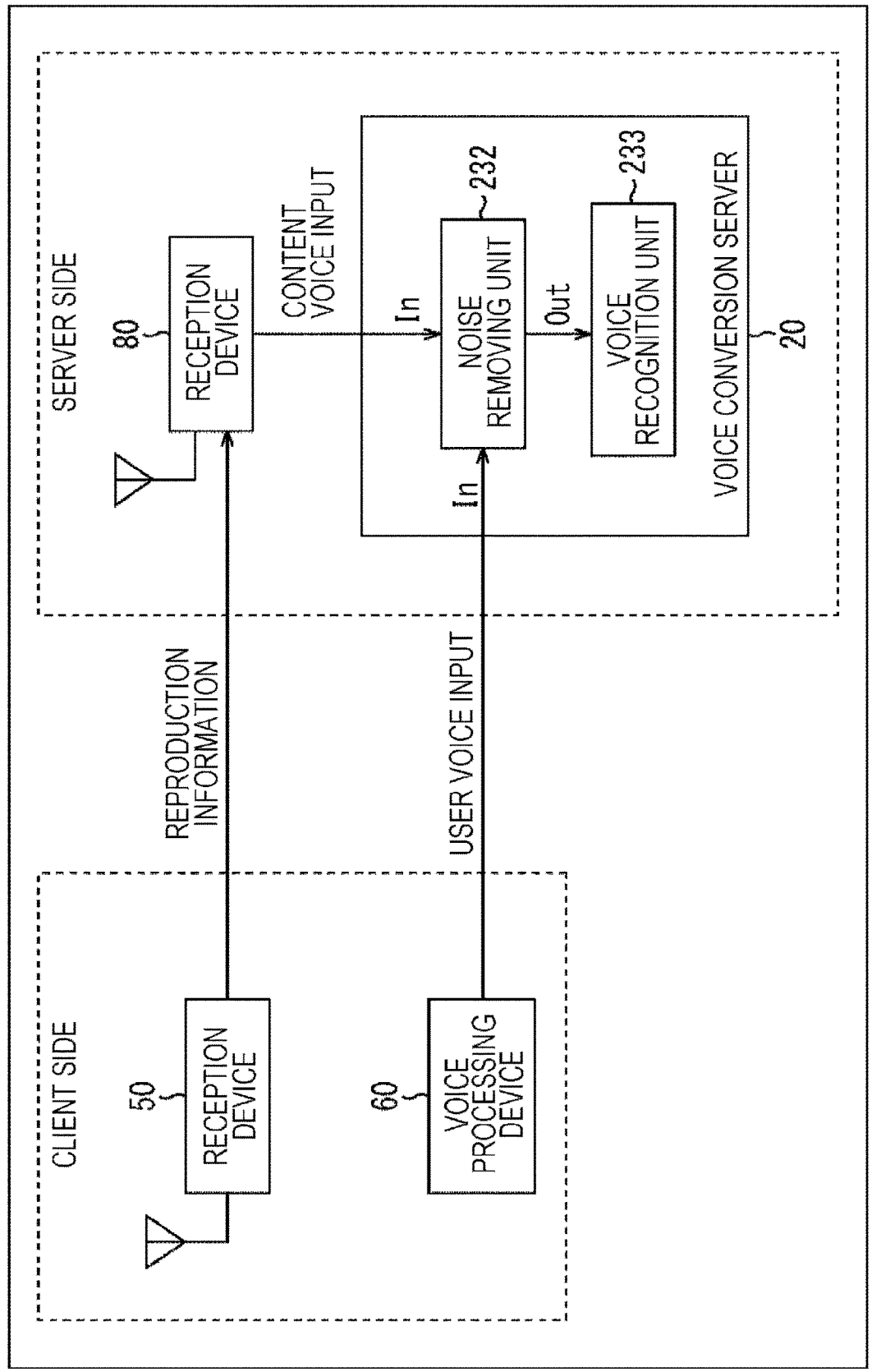
FIG. 13 is a diagram illustrating noise removing processing executed by a voice conversion server.

Specifically, as illustrated in FIG. 13, in the voice conversion server 20, the noise removing unit 232 receives the audio data (user audio data) from the client-side voice processing device 60, and the audio data (content audio data) on the broadcast content reproduced by the server-side reception device 80. However, the user audio data includes the voice waveform WF3 illustrated in FIG. 12. Also, the content audio data includes the voice waveform WF4 illustrated in FIG. 12.

The noise removing unit 232 performs noise removing processing on (the voice waveform WF3 of the voice corresponding to) the user audio data by using (the voice waveform WF4 of the voice corresponding to) the content audio data, thereby separating the audio data into (the voice waveform WF5 of the voice corresponding to) the audio data on the user's speech and (the voice waveform WF4 of the voice Corresponding to) the audio data on the broadcast content.

Thus, (the voice waveform WF5 of the voice corresponding to) the audio data on the user's speech from which noise due to the voice in the broadcast content is removed is obtained as the noise removed audio data. Further, in the voice recognition unit 233, the voice recognition processing using the information accumulated in the database 213 is performed, and the noise removed audio data from the noise removing unit 232 is converted into text data.

Referring again to FIG. 12, the function providing server 30 performs processing (e.g., voice interaction processing) on the text data from the voice conversion server 20, and transmits the processed data obtained as a result of the processing to the reception device 50 via the Internet 90. The client-side reception device 50 receives the processed data transmitted from the function providing server 30 via the Internet 90, and outputs the voice corresponding to the processed data.

In this case, for example, the server application including the TV Show function performs voice interaction processing, obtains a response "This actress is xxxx" ("xxxx" is the name of the actress) as a response to a question "Who is the actress?" made by the user, and outputs the voice corresponding to the response from the speaker 521 of the client-side reception device 50.

Thus, the user can know the name of an actress in a drama on the spot merely by speaking a question while viewing the drama. Further, the server-side voice conversion server 20 removes voices being made during reproduction of the drama when the voice recognition processing is performed on the user's speech, and the voice recognition processing is performed only on the voice from the user. Accordingly, not only the accuracy of voice recognition, but also the accuracy of voice interaction can be improved. Therefore, the voice interaction system 1 responds only to the user's voice, and a response to a user's question can be reliably obtained.

(Voice Interaction Processing for Removing Noise Due to Content Voice)

Next, a voice interaction processing flow for removing noise due to a content voice to be executed by the voice interaction system 1 illustrated in FIG. 12 will be described with reference to flowcharts of FIGS. 14 to 16.

Figure 14:
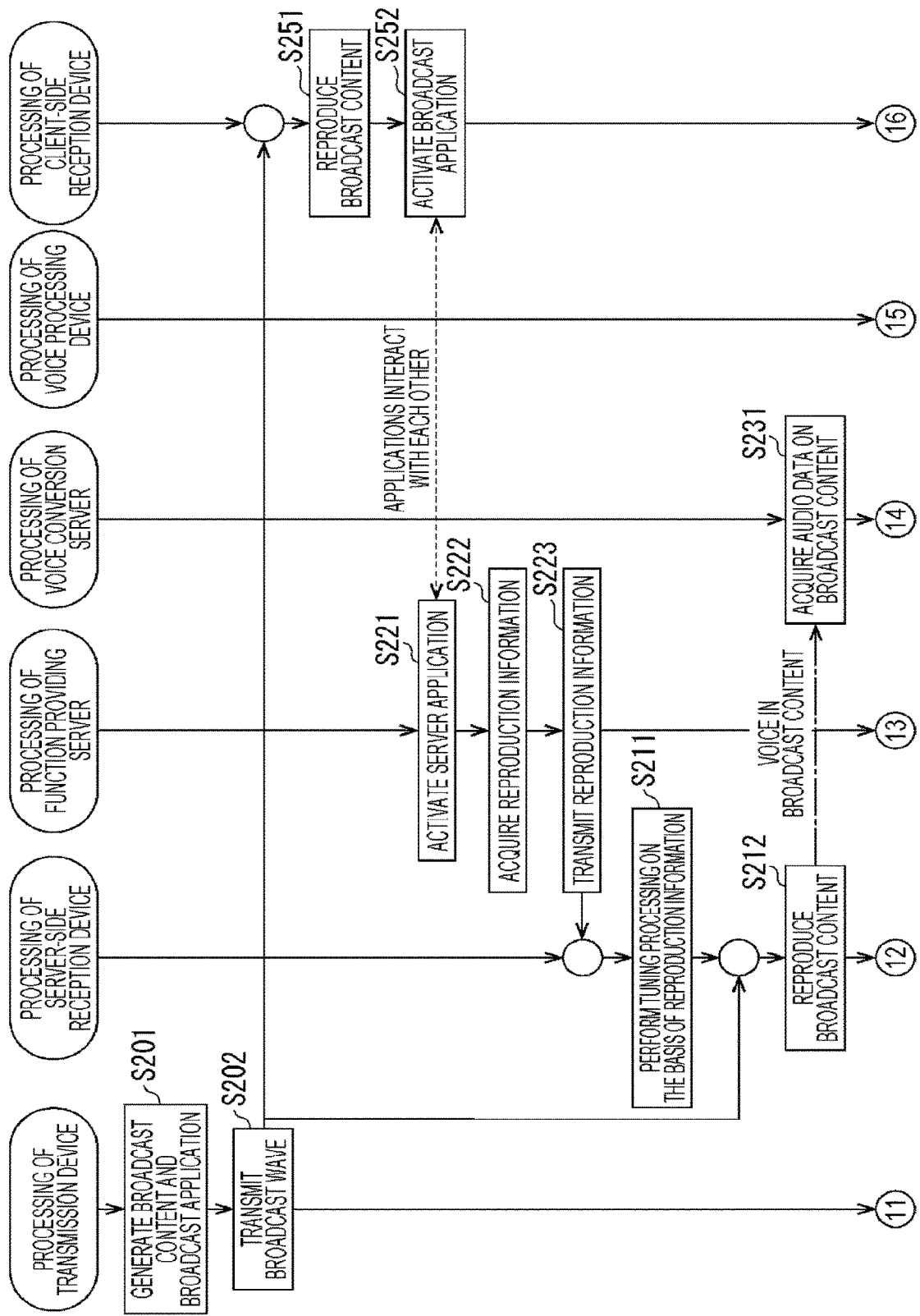
FIG. 14 is a flowchart illustrating a voice interaction processing flow for removing noise due to a voice in a content.
Figure 15:
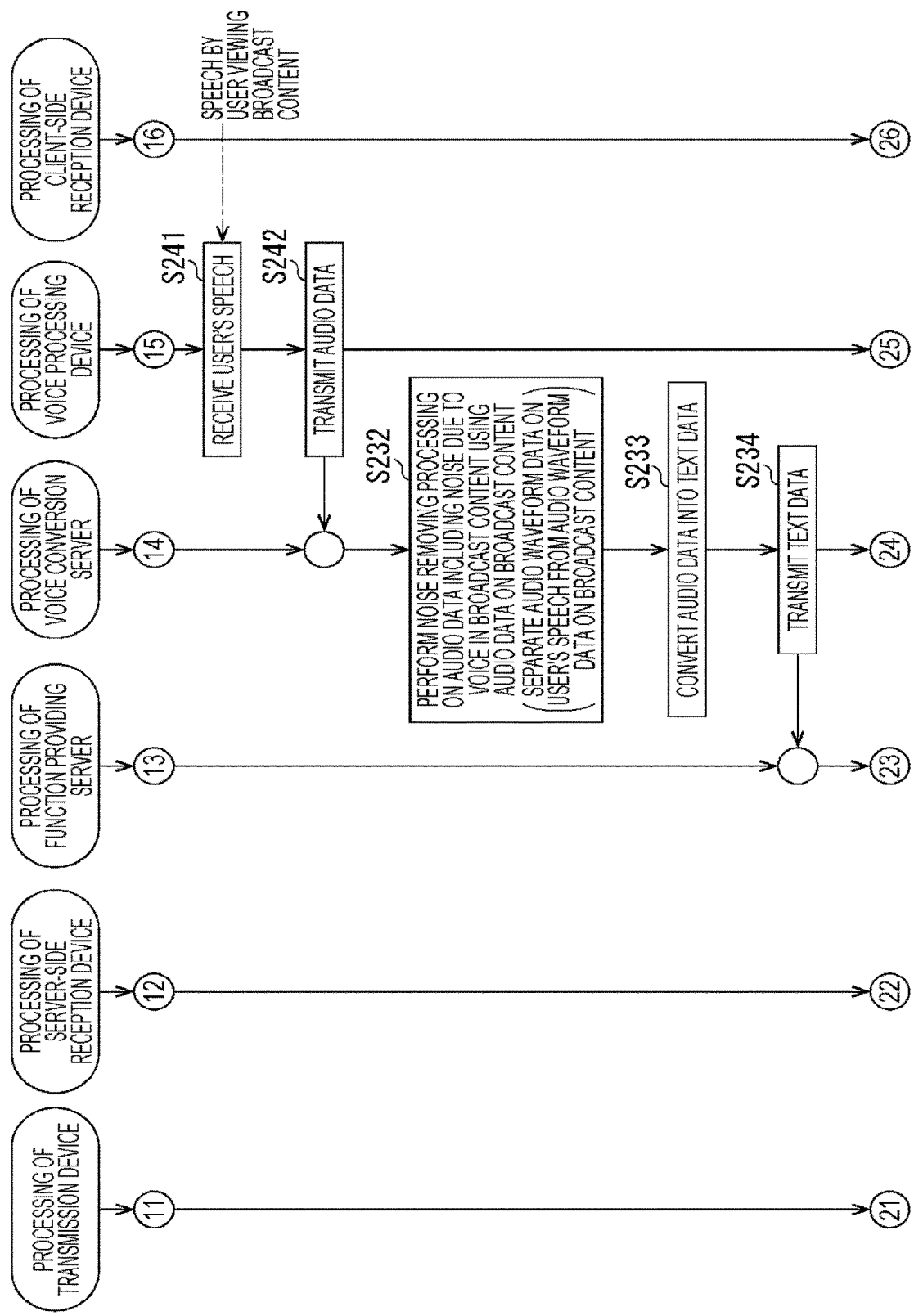
FIG. 15 is a flowchart illustrating a voice interaction processing flow for removing noise due to a voice in a content.
Figure 16:
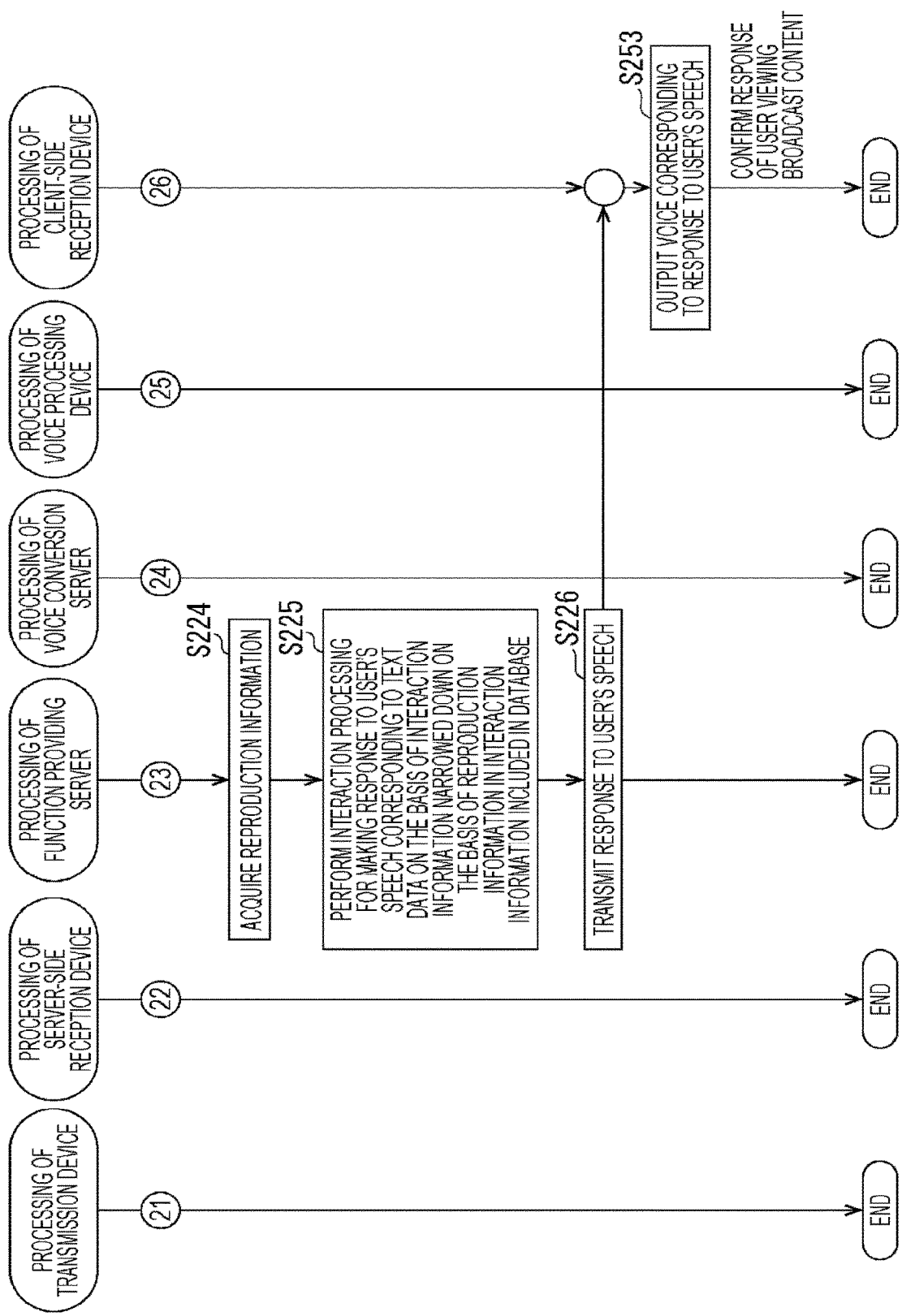
FIG. 16 is a flowchart illustrating a voice interaction processing flow for removing noise due to a voice in a content.

Referring to FIGS. 14 to 16, the processing of steps S201 to S202 is executed by the transmission device 10, which is installed in facilities of a broadcasting station or a transmitting station, and the processing of steps S211 to S212 is executed by the server-side reception device 80 installed in the data center. Note that the server-side reception device 80 has a configuration similar to that of the client-side reception device 50, and has, for example, a configuration illustrated in FIG. 6.

In addition, referring to FIGS. 14 to 16, the processing of steps S221 to S226 and the processing of steps S231 to S234 are executed by the function providing server 30 and the voice conversion server 20, respectively, which are installed in the data center. Further, the processing of steps S241 to S242 and the processing of steps S251 to S253 are executed by the voice processing device 60 and the client-side reception device 50, respectively, which are installed in the user's house.

In steps S201 to S202, like in steps S101 to S102 illustrated in FIG. 9, the transmission device 10 generates a broadcast content and a broadcast application, and transmits the generated broadcast content and broadcast application as a broadcast wave.

In steps S251 to S252, like in steps S141 to S142 illustrated in FIG. 9, the reception device 50 reproduces the broadcast content according to a tuning operation by the user, and the broadcast application interacting with the broadcast content is activated. On the other hand, in step S221, like in step S111 illustrated in FIG. 9, the function providing server 30 activates the server application.

In this case, the broadcast application executed by the client-side reception device 50 and the server application executed by the server-side function providing server 30 interact with each other via the Internet 90, thereby enabling use of the user interface for the voice agent service provided by the voice processing device 60 in the broadcast application. Note that detailed contents of the processing for causing the broadcast application and the server application to interact with each other have been described above with reference to the flowchart of FIG. 11, and thus the descriptions thereof are omitted.

In step S222, the function processing unit 311 acquires reproduction information. In this case, the broadcast application and the server application have already interacted with each other, thereby enabling the server application to acquire the reproduction information from the broadcast application. For example, the reproduction information includes a channel number (channel number for identifying the broadcast service) in the broadcast content being viewed by the user.

The reproduction information obtained as described above is transmitted to the server-side reception device 80 by the communication I/F 312 of the function providing server 30 (S223). Then, the reproduction information transmitted from the function providing server 30 is received by the server-side reception device 80, and the processing of step S211 to S212 is executed.

Specifically, the server-side reception device 80 performs the tuning processing on the basis of the reproduction information from the function providing server 30 (S211), receives and processes the broadcast wave according to the tuning processing, and reproduces the broadcast content (S212).

In this case, as the reproduction information from the function providing server 30, the channel number in the broadcast content (client-side reproduction content) reproduced by the client-side reception device 50 is obtained. Accordingly, in the server-side reception device 80, the tuning processing using the channel number is performed, thereby enabling reproduction of the broadcast content (server-side reproduction content) that is the same as that in the client-side reception device 50. Note that, in this case, information for specifying a scene being viewed by the user at that time, such as a reproduction time position in the broadcast content, is included as the reproduction information, thereby enabling the server-side reproduction content to be accurately synchronized with the client-side reproduction content.

The voice in the broadcast content reproduced by the server-side reception device 80 is collected by, for example, the microphone 214 of the voice conversion server 20. Further, in the voice conversion server 20, the audio data acquisition unit 231 acquires the audio data on the broadcast content (S231). Note that the voice waveform of the voice corresponding to the audio data on the broadcast content corresponds to the voice waveform WF4 illustrated in FIG. 12.

After that, in a case where the user viewing the broadcast content reproduced by the client-side reception device 50 has made a speech, the processing of steps S241 to S242 is executed by the voice processing device 60 which functions as the user interface for the voice agent service.

In steps S241 to S242, like in steps S131 to S132 illustrated in FIG. 9, the voice processing device 60 receives the user's speech, and the audio data on the user's speech is transmitted to the voice conversion server 20 via the Internet 90. Note that the voice waveform of the voice corresponding to the audio data to be transmitted corresponds to the voice waveform WF3 illustrated in FIG. 12.

The audio data transmitted from the voice processing device 60 is received by the voice conversion server 20 via the Internet 90, and the processing of steps S232 to S234 is executed.

In step S232, the noise removing unit 232 performs noise removing processing on the audio data (user audio data) from the client-side voice processing device 60 by using the audio data (content audio data) on the broadcast content reproduced by the server-side reception device 80. In this case, the content audio data is audio data on the server-side reproduction content. Further, the user audio data is audio data including noise due to the voice in the client-side reproduction content, as well as the user's speech.

Specifically, in this case, the noise removing unit 232 processes the voice (voice waveform WF3 illustrated in FIG. 12) corresponding to the audio data (user audio data) from the voice processing device 60 by using the voice (voice waveform WF4 illustrated in FIG. 12) corresponding to the audio data (content audio data) on the broadcast content obtained by the processing of step S231, thereby separating the voice into the voice waveform audio data (voice waveform WF5 illustrated in FIG. 12) on the user's speech and the voice waveform data (voice waveform WF4 illustrated in FIG. 12) on the broadcast content.

Note that the voice waveform WF4 (FIG. 12) of the voice in the server-side reproduction content has substantially the same shape as that of the voice waveform WF2 (FIG. 12) of the voice in the client-side reproduction content. Accordingly, the voice waveform WF5 (FIG. 12) of the user's speech obtained by the server side has substantially the same as that of the voice waveform WF1 (FIG. 12) of the user's speech on the client side, as described above.

Further, as the voice separation processing performed in the processing of step S232, known voice separation techniques can be used. For example, a voice of a user's speech and a voice in a broadcast content can be separated by a semi-blind voice separation processing disclosed in NPL 2 described below.

Non Patent Literature 2: "ICA-based robot audition for recognizing barge-in speech under reverberation", Ryu Takeda, Kazuhiro Nakadai, Tom Takahashi, Kazunori Komatani, Tetsuya Ogata, and Hiroshi G. Okuno, Graduate School of Informatics, Kyoto University, Honda Research Institute Japan, Co., Ltd.

Specifically, NPL 2 discloses a system in which, as semi-blind voice separation processing, in a case where a human interacts with a robot and when a mixture of a voice $Sr(\omega, f)$ corresponding to a robot's speech and a voice $Su(\omega, f)$ corresponding to a user's speech is collected by a microphone, the voice $Su(\omega, f)$ corresponding to the user's speech is separated using the fact that the voice $Sr(\omega, f)$ corresponding to the robot's speech can be recognized in advance.

Then, also in the voice separation processing performed in the processing of step S232, assuming that the voice $Sr(\omega, f)$ in NPL 2 corresponds to the voice in the broadcast content, the voice $Su(\omega, f)$ of the user's speech can be separated using the system.

Thus, noise that is due to the voice in the broadcast content and included in the user audio data is removed, and the voice conversion server 20 obtains the audio data (noise removed audio data) from which the noise due to the voice in the broadcast content is removed. Note that the voice waveform of the voice corresponding to the noise removing voice data corresponds to the voice waveform WF5 illustrated in FIG. 12.

In step S233, the voice recognition unit 233 performs voice recognition processing by referring to the database 213, and converts the audio data subjected to the noise removing processing in step S232 into text data. Note that as the voice recognition processing used herein, known voice recognition techniques, such as voice recognition processing using an acoustic model or a language model for example, can be used.

The text data converted in the processing of step S233 is transmitted to the function providing server 30 (S234). The text data from the voice conversion server 20 is received by the function providing server 30, and the processing of steps S224 to S226 is executed.

In steps S224 to S226, like in steps S112 to S114 illustrated in FIG. 10, the function processing unit 311 performs interaction processing for making a response (response to the user's speech) corresponding to the text data from the voice conversion server 20 on the basis of interaction information narrowed down on the basis of the reproduction information (e.g., an identifier for a broadcast content, a reproduction time position, a language of a voice or a caption, etc.) acquired by the processing of step S224 in the interaction information included in the database.

The response transmitted from the function providing server 30 is received by the client-side reception device 50 via the Internet 90, and the processing of step S253 is executed. Specifically, the broadcast application executed by the client-side reception device 50 outputs, from the speaker 521, the voice corresponding to the response (response to the user's speech) from the function providing server 30 (S253).

In this case, for example, when the user has asked the name of an actress in a drama being viewed by the user, a voice corresponding to a response "This actress is xxxx" ("xxxx" is the name of the actress) is output as a response to the question (e.g., a question "Who is the actress?"). This enables the user viewing the drama to know the name of the actress in the drama.

The voice interaction processing flow for removing noise due to the content voice has been described above.

Note that the above embodiments illustrate a case where, in the processing of step S222 illustrated in FIG. 14, the broadcast application interacting with the server application notifies the reproduction information such as the channel number. Alternatively, the reproduction information may be notified by the resident application of the reception device 50, or may be notified by the broadcast application using the API provided by the reception device 50.

Further, in the above descriptions, the noise removing processing of step S232 illustrated in FIG. 15 is performed at the stage (pre-stage) of the voice recognition processing of step S233 illustrated in FIG. 15, and the voice recognition processing using the noise removed audio data thus obtained is performed. The timing for performing the noise removing processing is not limited to the stage of the voice recognition processing, but instead the noise removing processing may be performed in the stage of, for example, any one of sound processing, language comprehension processing, interaction control processing, and the like.

The second embodiment has been described above. In the second embodiment, the broadcast application executed by the client-side reception device 50 and the server application executed by the server-side function providing server 30 interact with each other, and the server-side voice conversion server 20 removes noise due to the voice in the broadcast content reproduced by the reception device 50 from the audio data supplied from the voice processing device 60, thereby enabling use of the audio data for interaction processing only on the voice of the user's speech.

Specifically, in the voice interaction system 1 illustrated in FIG. 12, the voice processing device 60 which functions as the user interface for the voice agent service receives the user's speech. However, it is assumed that the voices collected by the microphone 614 of the voice processing device 60 include not only the voice of the user's speech, but also noise due to the voice in the broadcast content reproduced by the reception device 50. In the present technology, processing, such as voice recognition processing, is performed only on the user's voice, so that not only the accuracy of voice recognition, but also the accuracy of voice interaction can be improved.

Therefore, the voice interaction system 1 responds only to the user's voice, and a response to a user's question can be reliably obtained. On the other hand, it is possible to prevent the voice interaction system 1 from making an erroneous response on the basis of the voice in the broadcast content. In addition, means for separating noise using a directional microphone or the like is known, but it may be difficult to separate noise depending on a positional relationship between a television receiver and a user. On the other hand, in the voice interaction system 1 illustrated in FIG. 12, noise can be reliably removed, regardless of the positional relationship between the television receiver (reception device 50) and the user, which leads to an improvement in the accuracy of voice recognition.

Note that in the voice conversion server 20, if voice analysis information obtained by analyzing the voice in the broadcast content can be obtained in advance, the voice analysis information may be used instead of the audio data on the broadcast content to be reproduced by the reception device 80.

4. Modified Examples (Another Configuration of Reception Device)

The above embodiments illustrate a configuration in which the client-side reception device 50 and the voice processing device 60 are separate devices, but instead the reception device 50 and the voice processing device 60 may be integrated into one device (in-box device). For example, the voice processing device 60 may be provided as a voice processing module to be included in the functions of the reception device 50, and thus the voice processing device 60 may be configured as an in-box device.

Further, the above descriptions illustrate a case where the client-side reception device 50 is a fixed receiver, such as a television receiver, or a mobile receiver, such as a smartphone. However, the reception device 50 may be a wearable computer such as a head mounted display (HMD). Alternatively, the reception device 50 may be, for example, a device mounted in an automobile, such as an in-vehicle television. Specifically, the client-side reception device 50 may be any device, as long as the device can reproduce and record a content.

(Another Configuration of Server)

The above descriptions illustrate a case where the voice conversion server 20 and the function providing server 30 are configured as different servers, but instead the servers may be integrated into one server having the functions of the both servers.

Further, the above descriptions illustrate a case where the voice recognition service is provided by the voice conversion server 20, but instead the voice recognition function may be executed by the voice processing device 60 side.

Specifically, the voice processing device 60 can convert the audio data corresponding to the user's speech into text data and transmit the text data obtained as a result of the processing to the function providing server 30 via the Internet 90. Also, the database 213 used for the conversion may be provided by a server on the Internet 90, or may be held by the voice processing device 60.

Examples of Broadcast System

The above descriptions illustrate the ATSC (in particular, ATSC3.0) which is a system adopted in the United States and the like as a broadcast system for a broadcast content. However, the present technology may be applied to systems, such as integrated services digital broadcasting (ISDB), which is a system adopted in Japan and the like, and digital video broadcasting (DVB) which is a system adopted in European countries and the like.

Further, the above descriptions illustrate an example of ATSC3.0 in which an IP transmission system using UDP/IP packets is adopted. However, the present technology is not limited to the IP transmission system, and may be applied to other systems such as MPEG2-TS (Transport Stream) system, for example.

In addition, terrestrial broadcasting has been described above as a transmission line for transmitting a broadcast content. However, the present technology can use not only the terrestrial broadcasting, but also broadcast transmission lines for satellite broadcasting using broadcasting satellite (BS), communications satellite (CS), or the like, and wired broadcasting such as cable television (CATV), and communication transmission lines such as an Internet Protocol TV (IPTV) network and the Internet.

Note that the voice interaction system 1 illustrated in FIG. 1 or FIG. 12 has a configuration in which a single transmission device 10 (FIG. 2) of the broadcasting station includes the multiplexer 115 that performs multiplexing processing on a stream, and the transmission unit 116 that performs modulation processing and the like. However, in a general digital broadcasting system, the multiplexer 115 and the transmission unit 116 are installed in different locations. For example, the multiplexer 115 is installed in the broadcasting station, while the transmission unit 116 is installed in the transmitting station.

Examples of Applications

The broadcast application is not limited to an application developed using a script language, such as a markup language, such as HTML5, or JavaScript (registered mark). For example, an application developed using a programming language such as Java (registered trademark) may also be used. Further, the broadcast application is not limited to an application to be displayed, but instead may be executed in a non-display state on a background.

In addition, the application to be executed by the reception device 50 is not limited to an application to be executed by a browser, but instead may be executed as a so-called native application under an operating system (OS) environment (presentation control environment) or the like. Further, the application to be executed by the reception device 50 is not limited to an application to be acquired via broadcasting, but instead may be acquired via a communication from a server on the Internet 90.

Also, the content to be reproduced by the reception device 50 is not limited to the broadcast content delivered via broadcasting, but instead may be a communication content to be delivered via a communication. Examples of the communication content include a content to be delivered by video on demand (VOD) streaming, and a content that can be downloaded. In the voice interaction system 1 illustrated in FIG. 12, in a case where the client-side reception device 50 receives and reproduces the communication content delivered by streaming via the Internet 90, the same communication content may also be reproduced by the server-side reception device 80.

Note that in the voice conversion server 20, voice analysis information obtained by analyzing the voice in the communication content may be used instead of the audio data on the communication content, as long as the voice analysis information can be obtained in advance. Further, the broadcast content and the communication content can include any content such as TV programs (e.g., news, sports, dramas, etc.), movies, moving images, music, electronic books, games, and advertisements.

(Other)

Names used herein are examples only, and other names may be used in practice. However, a difference between the names is merely a formal difference, and thus the substantial contents denoted by the names are the same. For example, the activation keyword described above may also be referred to as a command word.

5. Configuration of Computer

Figure 17:
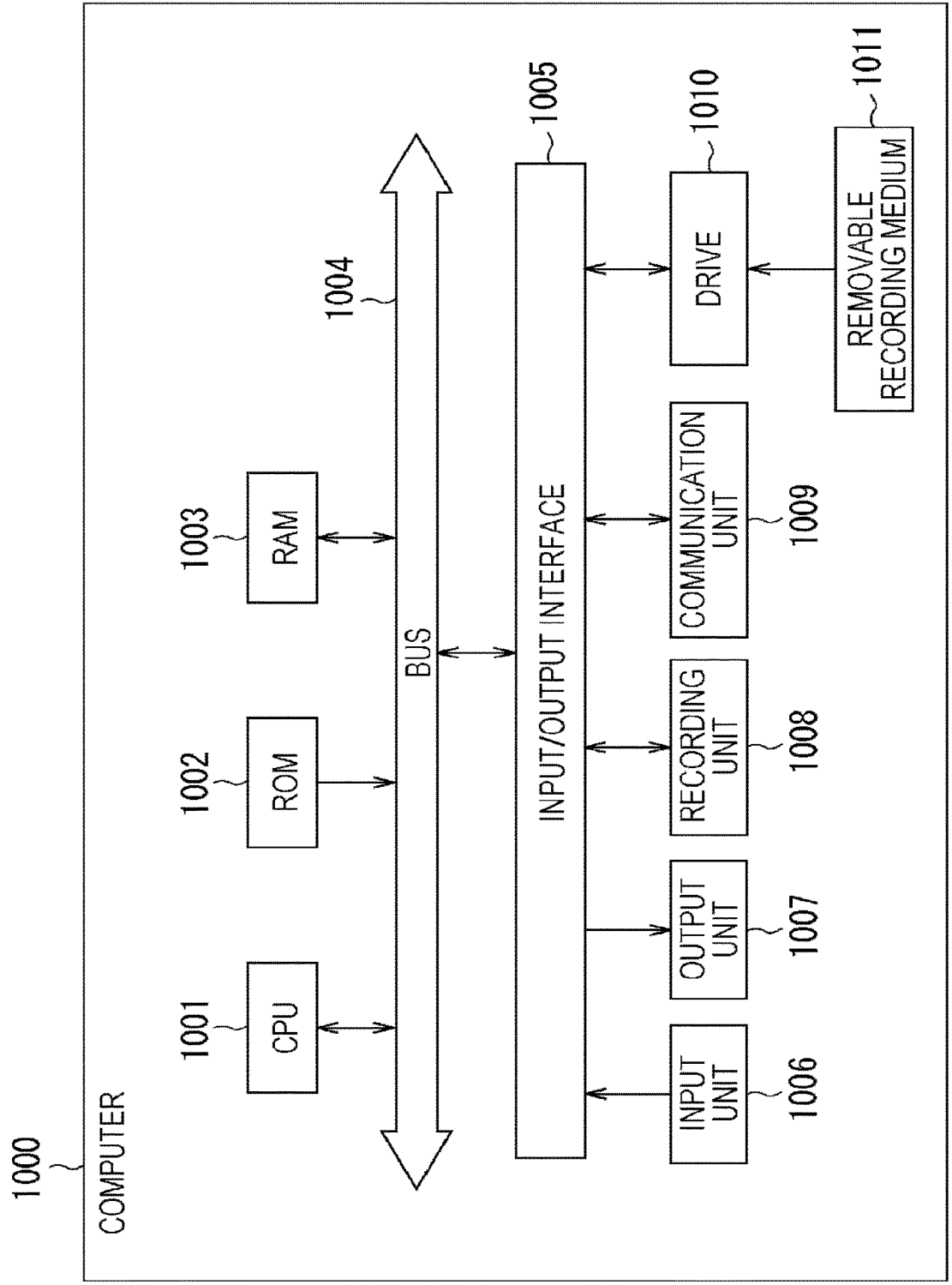
FIG. 17 is a block diagram illustrating a configuration example of a computer.

A series of processing (e.g., voice interaction processing illustrated in FIGS. 9 and 10, and voice interaction processing in which noise due to a content voice is removed as illustrated in FIGS. 14 to 16) described above can also be executed by hardware or software. In the case of executing the series of processing by software, a program constituting the software is installed in a computer of each device. FIG. 17 is a block diagram illustrating a hardware configuration example of a computer for executing the above-described series of processing by a program.

In a computer 1000, a central processing unit (CPU) 1001, a read only memory (ROM) 1002, and a random access memory (RAM) 1003 are connectable to each other by a bus 1004. The bus 1004 is also connected to an input/output interface 1005. The input/output interface 1005 is connected to an input unit 1006, an output unit 1007, a recording unit 1008, a communication unit 1009, and a drive 1010.

The input unit 1006 includes, for example, a keyboard, a mouse, or a microphone.

The output unit 1007 includes, for example, a display or a speaker. The recording unit 1008 includes, for example, a hard disk or a non-volatile memory. The communication unit 1009 includes, for example, a network interface. The drive 1010 drives a removable recording medium 1011, such as a magnetic disk, an optical disk, a magneto-optical disk, or a semiconductor memory.

In the computer 1000 having a configuration as described above, the CPU 1001 loads programs recorded in the ROM 1002 or the recording unit 1008 into the RAM 1003 via the input/output interface 1005 and the bus 1004, and executes the programs, thereby performing the above-described series of processing.

The programs executed by the computer 1000 (CPU 1001) can be provided by recording the programs in the removable recording medium 1011, for example, as package media or the like. In addition, the programs can also be provided via a wired or wireless transmission medium, such as a local network, the Internet, or a digital satellite broadcast.

In the computer 1000, the removable recording medium 1011 is mounted on the drive 1010, thereby enabling installation of the programs in the recording unit 1008 via the input/output interface 1005. Further, the programs may be received by the communication unit 1009 via a wired or wireless transmission medium, and may be installed in the recording unit 1008. In addition, the programs may be preliminarily installed in the ROM 1002 and the recording unit 1008.

Herein, the processing performed by the computer in accordance with the programs need not necessarily carried out in a chronological order according to the order of steps described in the flowcharts. Specifically, the processing performed by the computer according to the programs includes processing executed in parallel or individually (e.g., parallel processing or processing using an object). Also, the programs may be processed by one computer (processor), or may be processed in a distributed manner by a plurality of computers.

Note that the embodiments of the present technology are not limited to the embodiments described above, and can be modified in various ways without departing from the scope of the gist of the present technology.

The present technology may further include the following configurations.

(1)

An information processing apparatus including:
a processing unit configured to perform processing associated with a voice interaction with a user viewing a content, on the basis of a result of processing on noise removed audio data included in user audio data, the noise removed audio data being audio data obtained by removing noise due to a voice in the content, the user audio data being audio data on a speech made by the user,
in which the noise removed audio data is obtained by separating the user audio data from content audio data, the content audio data being audio data on the content acquired on the basis of reproduction information about the content to be reproduced.

(2)

The information processing apparatus according to (1), in which the result of processing on the noise removed audio data is obtained by separating voice waveform data on the speech made by the user viewing the content from voice waveform data on the content in a stage of any one of sound processing, voice recognition processing, language comprehension processing, and interaction control processing.

(3)

The information processing apparatus according to (2), in which the user audio data is audio data including noise due to a voice in a client-side reproduction content, as well as the speech made by the user viewing the client-side reproduction content to be reproduced by a client-side reception device, and the content audio data is audio data on a server-side reproduction content to be reproduced on the basis of reproduction information about the client-side reproduction content by a server-side reception device.

(4)

The information processing apparatus according to any of (1) to (3), in which the reproduction information includes identification information for identifying a service for providing the content.

(5)

The information processing apparatus according to any of (1) to (4), in which the content is a broadcast content to be transmitted as a broadcast wave.

(6)

The information processing apparatus according to (2), in which the processing unit processes the result of processing on the noise removed audio data by referring to interaction information narrowed down on the basis of the reproduction information in interaction information for implementing a voice interaction function included in a database, to perform processing associated with the voice interaction with the user viewing the content.

(7)

The information processing apparatus according to (6), in which
the processing unit executes a first application to be executed by a server side connected to the Internet, and the first application interacts with a second application to be executed by a client side reproducing the content, to enable use of a user interface provided by a voice agent service to implement the voice interaction function.

(8)
The information processing apparatus according to (6) or (7), in which the reproduction information includes at least first identification information for identifying a service for providing the content, second identification information for identifying the content, positional information indicating a reproduction time position in the content, and information about a language of a voice or a caption in the content.

(9)
The information processing apparatus according to any of (6) to (8), in which the content is a broadcast content to be transmitted as a broadcast wave, and the second application is a broadcast application interacting with the broadcast content.

(10)
An information processing method for an information processing apparatus, including: performing, by the information processing apparatus, processing associated with a voice interaction with a user viewing a content, on the basis of a result of processing on noise removed audio data included in user audio data, the noise removed audio data being audio data obtained by removing noise due to a voice in the content, the user audio data being audio data on a speech made by the user,
in which the noise removed audio data is obtained by separating the user audio data from content audio data, the content audio data being audio data on the content acquired on the basis of reproduction information about the content to be reproduced.

(11)
An information processing apparatus including:
a processing unit configured to acquire noise removed audio data by separating user audio data from content audio data, the user audio data being audio data on a speech made by a user viewing a content, the content audio data being audio data on the content acquired on the basis of reproduction information about the content to be reproduced, the noise removed audio data being audio data obtained by removing noise due to a voice in the content.

(12)
The information processing apparatus according to (11), in which
the user audio data is audio data including noise due to a voice in a client-side reproduction content, as well as the speech made by the user viewing the client-side reproduction content to be reproduced by a client-side reception device, and the content audio data is audio data on a server-side reproduction content to be reproduced on the basis of reproduction information about the client-side reproduction content by a server-side reception device.

(13)
The information processing apparatus according to (11) or (12), in which the reproduction information includes identification information for identifying a service for providing the content.

(14)
The information processing apparatus according to any of (11) to (13), in which the content is a broadcast content to be transmitted as a broadcast wave.

(15)
An information processing method for an information processing apparatus, including: acquiring, by the information processing apparatus, noise removed audio data by separating user audio data from content audio data, the user audio data being audio data on a speech made by a user viewing a content, the content audio data being audio data on the content acquired on the basis of reproduction information about the content to be reproduced, the noise removed audio data being audio data obtained by removing noise due to a voice in the content.

(16)
A system including:
circuitry configured to
acquire first audio data including a voice command captured by a microphone;
identify second audio data included in broadcast content corresponding to a timing at which the first audio data is captured by the microphone;
extract the second audio data from the first audio data to generate third audio data;
convert the third audio data to text data corresponding to the voice command; and output the text data.

(17)
The system of (16), wherein
the first audio data includes the voice command and fourth audio data corresponding to the broadcast content captured by the microphone.

(18)
The system of (17), wherein
the fourth audio data corresponds to noise caused by reproduction of the broadcast content captured by the microphone, and
the circuitry is configured to remove the noise by extracting the second audio data from the first audio data.

(19)
The system of any of (16) to (18), wherein
the system is a server, and
the server is configured to acquire the first audio data over a network from an apparatus including the microphone.

(20)
The system of any of (16) to (19), wherein
the circuitry is configured to acquire the second audio data from a reception apparatus that receives the broadcast content.

(21)
The system of any of (16) to (20), wherein
the circuitry is configured to acquire the first audio data including the voice command and fourth audio data corresponding to the broadcast content over a network from an apparatus including the microphone.

(22)
The system of (21), wherein
the circuitry is configured to acquire the second audio data included in the broadcast content from a reception apparatus that receives the broadcast content.

(23)
The system of (22), wherein
the reception apparatus is configured to identify the broadcast content to be received based on information received from a second reception device configured to reproduce the broadcast content for consumption by a user.

(24)
The system of (23), wherein
the reception apparatus is configured to execute an application, and the application is configured to receive the information from a second application executed at the second reception device.

(25)
The system of any of (16) to (24), wherein the circuitry is configured to: receive, from an application executed by a reproduction device configured to present content to a user, content information corresponding to the broadcast content presented to the user; and identify the second audio data based on the content information received from the application executed by the reproduction device.

(26)

The system of any of (16) to (25), wherein the circuitry is configured to: obtain content information for identifying the broadcast content; and generate a response to the voice command based on the text data and the content information for identifying the broadcast content.

(27)

The system of (26), wherein the circuitry is configured to transmit the generated response to the voice command to a reproduction apparatus via a network.

(28)

The system of (25), wherein the circuitry is configured to obtain the content information for identifying the broadcast content from a broadcast application that is executed by a reception apparatus configured to present the broadcast content to a user.

(29)

The system of any of (16) to (28), wherein the voice command includes an activation word that indicates the voice command is related to the broadcast content.

(30)

The system of (26), wherein the voice command includes a query related to the broadcast content; and the response to the voice command includes an answer to the query included in the voice command.

(31)

A method performed by an information processing system, the method including:

acquiring first audio data including a voice command captured by a microphone;

identifying second audio data included in broadcast content corresponding to a timing at which the first audio data is captured by the microphone;

extracting the second audio data from the first audio data to generate third audio data;

converting the third audio data to text data corresponding to the voice command; and outputting the text data.

(32)

An electronic device including:

circuitry configured to acquire first audio data including a voice command captured by a microphone and background noise based on a presentation of content to a user;

transmit first audio data to a server system; and receive a response to the voice command from the server system, the response to the voice command being generated by the server system by removing the background noise from the first audio data based on content information provided by the electronic device.

(33)

The electronic device of (32), wherein the circuitry is configured to execute a broadcast application while the content is presented to the user, and the broadcast application is configured to provide the content information corresponding to the content to the server system.

(34)

The electronic device of any of (32) to (33), further including:

a tuner configured to receive an over-the-air broadcast signal including the content.

(35)

The electronic device of (34), wherein the circuitry is configured to reproduce the content included in the broadcast signal to present the content to the user.

(36)

The electronic device of any of (32) to (35), further including:

a microphone configured to capture the first audio data.

(37)

The electronic device of any of (32) to (36), wherein the response to the voice command received from the server system is generated by identifying second audio data of the content based on the content information transmitted by the electronic device, extracting the second audio data from the first audio data to generate third audio data, and converting the third audio data to the voice command.

(38)

The electronic device of any of (32) to (37), further including:

a browser configured to process the response to the voice command received from the server system and output information corresponding to the response to the voice command to the user.

(38)

A method performed by an electronic device, the method including:

acquiring first audio data including a voice command captured by a microphone and background noise based on a presentation of content to a user;

transmitting first audio data to a server system; and receiving a response to the voice command from the server system, the response to the voice command being generated by the server system by removing the background noise from the first audio data based on content information provided by the electronic device.

REFERENCE SIGNS LIST 1 voice interaction system
10 transmission device
20 voice conversion server
30 function providing server
50 reception device
60 voice processing device
80 reception device
90 Internet
111 content generation unit
113 application generation unit
116 transmission unit
211 voice recognition processing unit
213 database
214 microphone
231 audio data acquisition unit
232 noise removing unit
233 voice recognition unit
311 function processing unit
313 database
331 speech comprehension unit
332 interaction control unit
333 speech generation unit
511 processing unit
512 memory 514 tuner
515 demultiplexer
516 voice decoder
517 voice output unit
518 video decoder
519 video output unit
520 browser
521 speaker
522 display unit
523 communication OF
1000 computer
1001 CPU

The invention claimed is:

1. A system comprising:
circuitry configured to
receive reproduction information from a reproduction device installed in a client side location, the reproduction information including an identifier of content that is reproduced by the reproduction device and a reproduction time position in the content;
acquire, after the reproduction information is received, first audio data captured by a microphone that is installed in the client side location, the first audio data including a voice command;
provide the reproduction information to a reception apparatus different from the reproduction device;
acquire, from the reception apparatus that receives via broadcasting the content according to the reproduction information, second audio data included in the content corresponding to a timing at which the first audio data is captured by the microphone;
remove noise corresponding to the second audio data from the first audio data to generate third audio data;
convert the third audio data to text data corresponding to the voice command; and
output the text data.

2. The system of claim 1, wherein
the first audio data includes fourth audio data corresponding to the noise that is caused by reproduction of the content captured by the microphone, and
the circuitry is configured to remove the noise by extracting the fourth audio data from the first audio data according to the second audio data.

3. The system of claim 1, wherein
the system is a server, and
the server is configured to acquire the first audio data over a network from an apparatus including the microphone.

4. The system of claim 1, wherein
the first audio data includes fourth audio data corresponding to the noise that is caused by reproduction of the content captured by the microphone, and
the circuitry is configured to acquire the first audio data including the voice command and the fourth audio data over a network from an apparatus including the microphone.

5. The system of claim 1, wherein
the reception apparatus is configured to execute an application, and
the application is configured to receive the reproduction information from a second application executed at the reproduction device.

6. The system of claim 1, wherein the circuitry is configured to:
receive, from an application executed by the reproduction device, the reproduction information; and
identify the second audio data based on the reproduction information received from the application executed by the reproduction device.

7. The system of claim 6, wherein
the circuitry is configured to obtain the reproduction information for identifying the content from the application that is a broadcast application received by the reproduction device via broadcasting.

8. The system of claim 1, wherein the circuitry is configured to:
generate a response to the voice command based on the text data and the content identified according to the reproduction information.

9. The system of claim 8, wherein
the circuitry is configured to transmit the generated response to the voice command to the reproduction device via a network.

10. The system of claim 8, wherein
the voice command includes a query related to the content; and
the response to the voice command includes an answer to the query included in the voice command.

11. The system of claim 1, wherein
the voice command includes an activation word indicating that the voice command is related to the content.

12. A method performed by an information processing system, the method comprising:
receiving reproduction information from a reproduction device installed in a client side location, the reproduction information including an identifier of content that is reproduced by the reproduction device and a reproduction time position in the content;
acquiring, after the reproduction information is received, first audio data captured by a microphone that is installed in the client side location, the first audio data including a voice command;
providing the reproduction information to a reception apparatus different from the reproduction device;
acquiring, from the reception apparatus that receives via broadcasting the content according to the reproduction information, second audio data included in the content corresponding to a timing at which the first audio data is captured by the microphone;
removing noise corresponding to the second audio data from the first audio data to generate third audio data;
converting the third audio data to text data corresponding to the voice command; and
outputting the text data.

13. The method of claim 12, further comprising:
receiving, from an application executed by the reproduction device, the reproduction information.

14. The method of claim 12, further comprising:
generating a response to the voice command based on the text data and the content identified according to the reproduction information.

15. The method of claim 12, wherein
the first audio data includes fourth audio data corresponding to the noise that is caused by reproduction of the content captured by the microphone, and
the first audio data including the voice command and the fourth audio data is acquired over a network from an apparatus including the microphone.

16. An electronic device comprising:
circuitry configured to:
transmit reproduction information to a server system, the reproduction information including an identifier of content that is reproduced by a reproduction device installed in a client side location and a reproduction time position in the content;

acquire, after the reproduction information is transmitted, first audio data captured by a microphone that is installed in the client side location, the first audio data including a voice command and noise corresponding to reproduction of the content;

transmit the first audio data to the server system; and receive a response to the voice command from the server system, the response to the voice command being generated by the server system by removing the noise from the first audio data based on second audio data obtained by the server system from a reception apparatus different from the reproduction device according to the reproduction information provided by the electronic device prior to acquisition of the first audio data.

17. The electronic device of claim 16, wherein the circuitry is configured to execute a broadcast application while the content is reproduced by the reproduction device, and the broadcast application is configured to provide the reproduction information corresponding to the content to the server system.

18. The electronic device of claim 16, further comprising:

a tuner configured to receive an over-the-air broadcast signal including the content according to the reproduction information.

19. The electronic device of claim 18, wherein the electronic device includes the reproduction device, and the circuitry is configured to reproduce the content included in the broadcast signal.

20. The electronic device of claim 16, further comprising:

a microphone configured to capture the first audio data.

21. The electronic device of claim 16, wherein the response to the voice command received from the server system is generated by acquiring the second audio data of the content based on the reproduction information transmitted by the electronic device, removing the noise corresponding to the second audio data from the first audio data to generate third audio data, and converting the third audio data to the voice command.

22. The electronic device of claim 16, wherein the circuitry is further configured to:

control a browser configured to process the response to the voice command received from the server system and output information corresponding to the response to the voice command.

23. A method performed by an electronic device, the method comprising:

transmitting reproduction information to a server system, the reproduction information including an identifier of content that is reproduced by a reproduction device installed in a client side location and a reproduction time position in the content;

acquiring, after the reproduction information is transmitted, first audio data captured by a microphone that is installed in the client side location, the first audio data including a voice command and noise corresponding to reproduction of the content;

transmitting the first audio data to the server system; and receiving a response to the voice command from the server system, the response to the voice command being generated by the server system by removing the noise from the first audio data based on second audio data obtained by the server system from a reception apparatus different from the reproduction device according to the reproduction information provided by the electronic device prior to acquisition of the first audio data.

* * * * *